US009322955B2

(12) United States Patent
Akasaka

(10) Patent No.: US 9,322,955 B2
(45) Date of Patent: Apr. 26, 2016

(54) PHASE DIFFERENCE FILM, METHOD FOR PRODUCING SAME, POLARIZING PLATE, AND LIQUID CRYSTAL DISPLAY DEVICE

(75) Inventor: Kazuki Akasaka, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 181 days.

(21) Appl. No.: 14/115,072

(22) PCT Filed: May 28, 2012

(86) PCT No.: PCT/JP2012/063585
§ 371 (c)(1),
(2), (4) Date: Oct. 31, 2013

(87) PCT Pub. No.: WO2012/165361
PCT Pub. Date: Dec. 6, 2012

(65) Prior Publication Data
US 2014/0142223 A1 May 22, 2014

(30) Foreign Application Priority Data
Jun. 3, 2011 (JP) ................................ 2011-124955

(51) Int. Cl.
| | | |
|---|---|---|
| *G02B 1/04* | (2006.01) | |
| *C08J 5/18* | (2006.01) | |
| *C08L 1/10* | (2006.01) | |
| *G02B 5/30* | (2006.01) | |
| *C08B 3/06* | (2006.01) | |
| *C08B 3/08* | (2006.01) | |
| *C08B 3/10* | (2006.01) | |
| *C08L 1/12* | (2006.01) | |

(52) U.S. Cl.
CPC ...... *G02B 1/04* (2013.01); *C08B 3/06* (2013.01); *C08B 3/08* (2013.01); *C08B 3/10* (2013.01); *C08J 5/18* (2013.01); *C08L 1/10* (2013.01); *C08L 1/12* (2013.01); *G02B 5/30* (2013.01); *C08J 2301/10* (2013.01); *G02B 5/3083* (2013.01)

(58) Field of Classification Search
CPC .............. G02B 1/04; G02B 5/30; C08J 5/18; C08L 1/10
See application file for complete search history.

(56) References Cited

U.S. PATENT DOCUMENTS

| | | | |
|---|---|---|---|
| 8,545,737 B2 | 10/2013 | Kaneko | |
| 2009/0096962 A1* | 4/2009 | Shelton et al. | ................. 349/96 |
| 2009/0099308 A1 | 4/2009 | Takebe et al. | |
| 2009/0171079 A1 | 7/2009 | Higuchi | |
| 2010/0181702 A1 | 7/2010 | Takebe et al. | |
| 2010/0245730 A1 | 9/2010 | Nimura et al. | |

FOREIGN PATENT DOCUMENTS

| | | |
|---|---|---|
| JP | 2002192541 A | 7/2002 |
| JP | 2008023917 A | 2/2008 |
| JP | 2009-019123 A | 1/2009 |
| JP | 2009-155555 A | 7/2009 |
| JP | 2009-251094 A | 10/2009 |
| JP | 2009-299075 A | 12/2009 |
| JP | 2010-529216 A | 8/2010 |
| JP | 2010253929 A | 11/2010 |
| JP | 2011-053645 A | 3/2011 |
| JP | 2011069857 A | 4/2011 |

OTHER PUBLICATIONS

International Preliminary Report on Patentability (IPRP) dated Dec. 4, 2013 (and English translation thereof) issued in International Application No. PCT/JP2012/063585.
International Search Report (ISR) dated Aug. 28, 2012 (and English translation thereof) issued in International Application No. PCT/JP2012/063585.
Japanese Office Action (and English translation thereof) mailed Nov. 10, 2015, issued in counterpart Japanese Application No. 2013-518068.

\* cited by examiner

*Primary Examiner* — Ling Choi
*Assistant Examiner* — Lanee Reuther
(74) *Attorney, Agent, or Firm* — Holtz, Holtz & Volek PC

(57) ABSTRACT

The problem of the present invention is to provide a phase difference film, by utilizing a cellulose ester having an acyl group substitution degree of less than 2.0 and improved compatibility, having high phase difference property despite its small film thickness and imparting high contrast and optical transmittance to a liquid crystal display device. A polarizing plate and a liquid crystal display device provided with the phase difference film are also provided. The phase difference film of the invention contains a cellulose ester which is obtained by substituting an acyl group having at least two carbon atoms for a hydroxy group in a glucose unit composing a cellulose, the film satisfies specific expressions when $DS_2$, $DS_3$ and $DS_6$ are degrees of substitution of the acyl groups for the hydroxy groups at a 2C, 3C and 6C positions, respectively, of the glucose unit.

10 Claims, No Drawings

PHASE DIFFERENCE FILM, METHOD FOR PRODUCING SAME, POLARIZING PLATE, AND LIQUID CRYSTAL DISPLAY DEVICE

FIELD OF THE INVENTION

The present invention relates to a phase difference film, a method for producing the film, a polarizing plate and a liquid crystal display device provided with the film.

BACKGROUND ART

A phase difference film is used for enlarging a viewing angle of a liquid crystal display device. As a liquid crystal display device is developed, even higher performance is being requested for a phase difference film so that large phase difference (retardation) performance can be expected even when a thickness of the film becomes small.

Among phase difference films, a cellulose ester film is superior in permeability which is necessary for producing a polarizing plate. A cellulose ester such as a triacetyl cellulose having an acyl group substitution degree of nearly three or diacetyl cellulose having an acyl group substitution degree of about 2.5 has been widely investigated. A cellulose ester, however, having an acyl group substitution degree of smaller than 2 has been studied little.

Patent Document 1 discloses a film using a cellulose ester having an acyl group substitution degree of smaller than 2. However, Patent Document 1 does not disclose transparency and compatibility of a resin having an acyl group substitution degree of smaller than 2.0.

The present inventor, however, has found as the result of various investigations of cellulose ester films having an acyl group substitution degree of smaller than 2 that, although the phase difference retardation performance becomes large and water permeability is excellent, there are problems such that transparency of the cellulose ester itself becomes degraded and compatibility with other polymers or other plasticizers is decreased when an acyl group substitution degree of a cellulose ester is smaller than 2.0.

The inventor also evaluated the cellulose ester film disclosed in Patent Document 1 as a polarizing plate for a liquid crystal display device and found a problem for the first time that the cellulose ester film has a poor contrast and a low optical transmittance.

Patent Document 2 discloses a producing method of a cellulose ester which the hydroxy group at the sixth position (6C) of a glucose unit is highly acetylated.

According to the Patent Document 2, expression of optical anisotropy will be degraded and function as a phase difference film will become insufficient when acyl group substitution degrees at the second (2C), third (3C) and sixth (6C) positions of the cellulose ester are almost the same degree. However, there is no description about transparency and compatibility of a resin composing the cellulose ester film. In addition, there is no description in a case where an acyl group substitution degree is smaller than 2.

When the acyl group substitution degree is smaller than 2, although the expression of the phase difference retardation does not become a problem even when acyl group substitution degrees at the 2C, 3C and 6C positions of the cellulose ester are almost the same degree, it causes the problem of a poor contrast and a low optical transmittance as explained above.

It is also a task to achieve high contrast and high optical transmittance that is required from the needs for further high-quality development in recent years.

PRIOR ART DOCUMENTS

Patent Documents

Patent Document 1: JP2010-529216A
Patent Document 2: JP2009-19123A

SUMMARY OF THE INVENTION

Problems to be Solved

In view of the above, an object of the present invention is to provide a phase difference film that exhibits high phase difference property even with a thin film thickness and imparts a high contrast and a high optical transmittance to a liquid crystal display device by utilizing characteristics of a cellulose ester having an acyl group substitution degree of less than 2.0 and improving compatibility of the cellulose ester.

Means to Solve the Problem

The object of the present invention is achieved by the following means.

1. A phase difference film containing a cellulose ester which is obtained by substituting an acyl group having at least two carbon atoms for a hydroxy group in a glucose unit composing the cellulose, and the film satisfies following expressions (1) and (2) below:

$$1.0 \leq DS_2 + DS_3 + DS_6 \leq 2.0 \tag{1}$$

and $$0.6 \leq DS_6 \tag{2}$$

where $DS_2$, $DS_3$ and $DS_6$ are degrees of substitution of the acyl groups for the hydroxy groups at a second (2C), third (3C) and sixth (6C) position, respectively, of the glucose unit.

2. The phase difference film of the above item 1, which contains at least one compound selected from a vinyl-based polymer or a vinyl-based oligomer, a saccharide-carboxylic acid ester compound and a compound expressed by a following formula (B). A content of the at least one compound is 1.0 to 50% by mass with respect to a total mass of the phase difference film.

$$B\text{-}(G\text{-}A)_n\text{-}G\text{-}B \tag{Formula (B):}$$

where A represents a C4-12 alkylene dicarboxylic acid residue or C6-12 aryl dicarboxylic acid residue, B represents a hydroxy group or carboxylic acid residue, G represents C2-12 alkylene glycol residue, C6-12 aryl glycol residue or C4-12 oxyalkylene glycol residue, and n represents an integer of one or larger.

3. The phase difference film of the above item 1 or 2, of which a haze value is 0.01 to 0.80%.

4. A method for producing the phase difference film of any one of the above items 1 to 3, in which the degree of acyl group substitution for the hydroxy group at the 6C position of the glucose unit is adjusted based on an acylation reaction rate.

5. A polarizing plate provided with the phase difference film of any one of the above items 1 to 3.

6. A liquid crystal display device provided with the phase difference film of any one of the above items 1 to 3.

Effect of the Invention

According to the above explained means, a phase difference film that exhibits high phase difference property despite a thin film thickness and imparts a high contrast and a high optical transmittance to a liquid crystal display device by utilizing characteristics of a cellulose ester having an acyl group substitution degree of smaller than 2.0 and improving compatibility of the cellulose ester. A polarizing plate and a liquid crystal display device can be also provided.

PREFERRED EMBODIMENT TO CARRY OUT THE INVENTION

The phase difference film according to the present invention features that the film contains a cellulose ester which is obtained by substituting an acyl group having at least two carbon atoms for a hydroxy group in a glucose unit composing the cellulose and the film satisfies the above expressions (1) and (2), where $DS_2$, $DS_3$ and $DS_6$ are degrees of substitution of the acyl groups for the hydroxy groups at 2C, 3C and 6C position, respectively, of the glucose unit.

This technical feature is common to the present invention of the above items 1 to 6.

As an embodiment of the invention, from the viewpoint of realizing the effect of the invention, preferably the film contains at least one compound selected from a vinyl-based polymer, a vinyl-based oligomer, a saccharide carboxylic acid ester compound and a compound expressed by the above formula (B) and a content of, the compound is 1.0 to 50% by mass with respect to a total mass of the phase difference film. Moreover, it is preferable that the haze value of the film is in a range of 0.01 to 0.80%.

According to a method for producing the phase difference film of the invention, preferably the degree of acyl group substitution for the hydroxy group at the 6C position of the glucose unit is adjusted based on a reaction rate of an acylation reaction.

The phase difference film of the invention may be preferably applied to a polarizing plate or a liquid crystal display device.

The present invention and structural elements thereof will be explained in detail hereinafter by way of an embodiment of the invention. In the explanation, the symbol "–" means that the figures on both sides of the symbol are included in the range as a minimal value and a maximum value.

(Summary of the Phase Difference Film of the Invention)

The phase difference film of the invention contains a cellulose ester which is obtained by substituting an acyl group having at least two carbon atoms for a hydroxy group in a glucose unit that structures the cellulose, and the film satisfies following expressions (1) and (2) below:

$$1.0 \leq DS_2 + DS_3 + DS_6 \leq 2.0 \quad (1)$$

and $$0.6 \leq DS_6 \quad (2)$$

where $DS_2$, $DS_3$ and $DS_6$ are degrees of substitution of the acyl groups for the hydroxy groups at 2C, 3C and 6C positions, respectively, of the glucose unit.

It is known that, in general, a cellulose ester exhibits higher phase difference performance as the degree of acyl group substitution becomes smaller. The present inventor has found that, based on the investigations about the cellulose ester film having an acyl group substitution degree of smaller than 2, the transparency of a cellulose ester itself becomes poor and compatibility with other polymers and other plasticizers becomes decreased as the degree of acyl group substitution becomes small.

The cellulose ester is that the hydroxy groups (hydroxyl groups) at the 2C, 3C and 6C positions of a glucopyranose ring are substituted by acyl groups. When all of the three hydroxy groups (hydroxyl groups) are substituted, the solubility will be decreased and it will become difficult to form a film from a solution. Accordingly, the degree of acyl group substitution of the cellulose ester is set within 2.7-2.9 (2.7 to 2.9). When more enhanced phase difference performance is required, the degree of acyl group substitution may be set from 2.2 to 2.5.

On the other hand, when the degree of acyl group substitution of the cellulose ester is decreased, the number of the hydroxy (hydroxyl) group in one glucopyranose ring is increased and it is estimated that a degree of hydrogen bond in the cellulose ester molecule or between the molecules will become high.

The inventor of the invention found the following phenomena from various investigations in the cellulose ester having an acyl group substitution degree of smaller than 2.0.

Among three hydroxy groups of the glucopyranose ring of the cellulose ester, 6C hydroxy group is the most active. The 6C hydroxy group is connected to the glucopyranose ring via a methylene group. Therefore, it is assumed that the 6C hydroxy group has a high motility and activity and particularly forms hydrogen bonding between molecules, and molecular chains of the cellulose ester are entangled, so that the resin transparency and compatibility with other polymers and with various plasticizers are decreased.

According to the present invention, the problem is surmountable by making the ratio of the hydroxy group at 6C position no more than a predetermined value. That is, the problem is surmountable by making the degree of substitution of the acyl group for the 6C hydroxy group 0.6 or larger.

When the total degree of acyl group substitution is 1.5, the degree of acyl group substitution at 6C position is 0.3 to 0.4 in general.

The phase difference film of the invention may contain various kinds of thermoplastic resins such as acrylic resin, ring-shaped or non ring-shaped olefin resin, polycarbonate resin or polyester resin or various additives explained later.

(Synthesis Method of Cellulose Ester)

A basic principle for synthesizing method of cellulose ester is described in Wood Chemistry (Migita, et al, Kyoritu Shuppan, 1968, pp. 180-190). A representative method is a liquid phase acetylation method using acetic anhydride, acetic acid and sulfuric acid catalyst.

Specifically, cellulose raw material such as wood pulp is pretreated by an appropriate amount of organic acid and is esterified by mixing in a cooled acylation solution so as to synthesize a perfect cellulose ester (the total degree of acyl group substitution at 2C, 3C and 6C is almost 3.00). The acylation solution generally includes an organic acid as a solvent, an organic acid anhydride as an esterifying agent and a sulfuric acid as a catalyst. The organic acid anhydride is generally used in an excessive stoichiometric amount than the total amount of cellulose and water in the system to be reacted. After acylation reaction, a solution of neutralization agent such as carbonate, acetate or oxide of calcium, magnesium, iron, aluminum or zinc so as to hydrolyze the excessive organic anhydride and neutralize the esterifying catalyst remained in the system.

Next, thus obtained perfect cellulose ester is kept at 50 to 90° C. under the presence of small amount of acetylation catalyst (generally remaining sulfuric acid) to saponify and mature until the cellulose ester having desired acyl group substitution degree and polymerization degree is obtained. When desired cellulose ester is obtained, the cellulose ester is separated by neutralizing the remaining catalyst in the system perfectly using the above neutralizing agent or by throwing the cellulose ester solution into water or diluted sulfuric acid without neutralization (or by adding water or diluted sulfuric acid in the cellulose ester solution). The separated cellulose ester is washed and stabilized to finish the cellulose ester.

The above synthesizing method of cellulose ester produces a cellulose ester having higher degree of acyl group substitution at 2C and 3C than the degree of acyl group substitution at 6C. Accordingly, it is necessary to adjust reaction conditions especially for obtaining the cellulose ester of the present invention.

Preferably the amount of sulfuric acid catalyst is reduced and the acylation time is increased (for aging) as concrete conditions. In a case where the amount of sulfuric acid catalyst is large, while the acylation reaction rate will be accelerated, sulfate ester is produced by the reaction with the cellulose in accordance with the amount of the catalyst and causes liberation after the reaction so as to generate a remaining hydroxy group. Since the sulfate ester tends to be produced at 6C position which is more reactive and thus when the sulfuric acid catalyst is large, the degree of acyl group substitution at 6C becomes small.

Therefore, it is necessary to reduce the amount of the sulfuric acid catalyst as possible and extend the reaction time so as to compensate the lowered reaction rate to synthesize the cellulose ester of the invention. The adjustment of degree of substitution at 2C and 3C positions can be controlled by changing the reaction conditions.

The cellulose ester of the present invention preferably includes at least one selected from the group consisting of cellulose acetate, cellulose diacetate, cellulose acetate propionate and cellulose acetate butylate.

The degree of substitution of acetyl group or other acyl group was determined using the method defined by ASTM-D817-96 (testing cellulose acetate, etc.).

The degree of acyl group substitution at 2C, 3C and 6C positions of the cellulose ester were determined by the method described in Carbohydr. Res. 273 (1995) 83-91 (Tezuka, et al) using $^{13}$C-NMR.

The number average molecular weight (Mn) of the cellulose ester is preferably 30,000 to 300,000 to obtain a film of high mechanical strength and 50,000 to 200,000 is more preferable.

A ratio (Mw/Mn) of the weight average molecular weight (Mw) and the number average molecular weight (Mn) of the cellulose ester is preferably 1.4 to 3.0.

The weight average molecular weight (Mw) and the number average molecular weight (Mn) of the cellulose ester were measured using a gel permeation chromatography (GPC).

The measurement conditions are as follows.
Solvent: methylene chloride
Column: Shodex K806, K805, K803G (Showa Denko K.K., three columns were connected)
Column temperature: 25° C.
Sample concentration: 0.1% by mass
Detector: RI Model 504 (GL Sciences Inc.)
Pump: L6000 (Hitachi, Ltd.)
Flow rate: 1.0 ml/min
Calibration curve: prepared using 13 samples (Mw=1000000 to 500) of standard polystyrene STK standard polystyrene (TOSOH Corporation) at even intervals.

A raw cellulose material for the cellulose ester of the invention is not limited and may be cotton linter, wood pulp or kenaf. The cellulose ester obtained from each material may be used in combination in any ratio.

Specifically, the cellulose ester may be synthesized by a method described in JP2010-42676A.

(Vinyl-Based Polymer or Vinyl-Based Oligomer)

The phase difference film of the invention preferably contains at least one compound selected from a vinyl-based polymer, a vinyl-based oligomer, a saccharide-carboxylic acid ester compound and a compound expressed by a following formula (B), and a content of the at least one compound is preferably 1.0 to 50% by mass with respect to a total mass of the phase difference film.

The vinyl-based polymer and a vinyl-based oligomer is not limited and may preferably have a substituent selected from the group consisting of a carboxy group, alkoxycarbonyl group, hydroxy group, amino group, amido group and sulfone group. The weight average molecular weight (Mw) is preferably 500 to 200,000 and the content thereof is 1.0 to 50% by mass with respect to the total mass of the film.

The carboxy group is a group having a —COO— structure. The amino group is a group having a NR1, R2, R3 structure and R1, R2 and R3 each represents a substituent such as a hydrogen atom, alkyl group, phenyl group or the like.

The amido group has a —NHCO— structure and may be connected to a substituent such as an alkyl group, phenyl group or the like.

The polymer or oligomer of the invention may be a vinyl-based polymer or oligomer described below.

Preferably the compound has high compatibility, and the compound has light transmittance of 80% or more, preferably 90% or more and more preferably 92% or more over the visible range (400 to 800 nm) when formed in a film shape.

The vinyl-based polymer or oligomer of the invention may be composed of one kind of monomer or of multiple kinds of monomers. Preferably the monomer is an acrylic ester or a methacrylic ester, and may include another appropriate monomer such as a maleic anhydride or styrene according to retardation characteristics, wavelength dispersion characteristics or heat resistance of a film to be formed.

The vinyl-based polymer or oligomer of the invention will be described as a polymer X hereinafter.

(Polymer X)

Preferably the polymer X of the invention is a polymer which is synthesized by copolymerization of ethylene-type unsaturated monomers Xa, Xb and Xc which have no aromatic ring in a molecule. The polymer has a weight average molecular weight (Mw) of 500 to 200,000 and is represented by a following general formula (3). Preferably the polymer is in a solid state at the temperature of 30° C. or less or has a glass transition temperature of 35° C. or more.

The polymer of the weight average molecular weight (Mw) of 500 or larger has improved unevenness at a corner and the polymer of the weight average molecular weight (Mw) of 200,000 or smaller has high compatibility with a cellulose ester and high transparency.

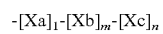

where l, m or n indicates a molar ratio and l+m+n=100.

Examples of a unit monomer of the polymer X are listed below without intention of limitation.

An ethylene-type unsaturated monomer Xa, Xb or Xc having no aromatic ring in a molecule is, for example, methyl acrylate, ethyl acrylate, (i- or n-)propyl acrylate, (n-, s- or t-)butyl acrylate, (n-, i- or s-)pentyl acrylate, (n- or i-)hexyl acrylate, (n- or i-)heptyl acrylate, (n- or i-)octyl acrylate, (n- or i-)nonyl acrylate, (n- or i-)myristyl acrylate, 2-etylhexyl acrylate, ε-caprolactone acrylate, 2-hydroxyethyl acrylate and 2-ethoxyethyl acrylate or methacrylate esters of above compounds.

Other examples of the monomer are: a monomer containing a hydroxy group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate or 4-hydroxymethylcyclohexyl-methylacrylate; a monomer containing a carboxy group such as (meth)acrylate, carboxyethyl (meth)acrylate, carboxypentyl (meth)acrylate, itaconic acid, maleic acid, fumaric acid and crotonic acid; a monomer containing acid anhydride such as maleic acid anhydride and itaconic acid anhydride; caprolactone additives of acrylic acid; sulfonic acid-containing monomer such as styrene sulfonate, allyl sulfonate, 2-(meth) acrylamido-2-methylpropane surfonate, (meth)acrylamidopropane sulfonate, sulfopropyl (meth)acrylate and (meth) acryloyloxynaphthalene sulfonate; and phosphoric group containing monomer such as 2-hydroxyethylacryloyl phosphate.

Examples of a monomer for reforming purpose are: (N-substituted) amide-based monomer such as (meth)acrylamide, N—N dimethyl (meth)acrylamide, N-butyl (meth) acrylamide, N-methylol (meth)acrylamide and N-methylolpropane (meth)acrylamide; alkylaminoalkyl (meth)acrylate-based monomer such as aminoethyl (meth)acrylate, N,N-dimethylaminoethyl (meth)acrylate and t-butylaminoethyl (meth)acryl; alkoxyalkyl (meth)acrylate-based monomer such as methoxyethyl (meth)acrylate and ethoxyethyl (meth) acrylate; and succinimide-based monomer such as N-(meth) acryloyloxymethylene succinimide, N-(meth)acryloyl-6-oxyhexamethylene succinimide, N-(meth)acryloyl-8-oxyoctamethylene succinimide and N-acryloyl morpholine.

In addition, a vinyl monomer such as vinyl acetate, vinyl propionate, N-vinyl pyrrolidone, methylvinyl pyrrolidone, vinyl pyridine, vinyl piperidone, vinyl pyrimidine, vinyl piperazine, vinyl pyrazine, vinyl pirrole, vinyl imidazole, vinyl oxazole, vinyl morpholine, N-vinyl carboxylic acid amides, styrene, α-methylstyrene, and N-vinyl caprolactam; cyanoacrylate monomer such as acrylonitrile and methacrylonitrile; epoxy group containing acrylic monomer such as glycidyl (meth)acrylate; glycol acrylate monomer such as polyethyleneglycol (meth)acrylate, polypropyleneglycol (meth)acrylate, methoxyethyleneglycol (meth)acrylate and methoxypolypropyleneglycol (meth)acrylate; and acrylic ester monomer such as tetrahydrofurfuryl (meth)acrylate, fluorine (meth)acrylate, silicone (meth)acrylate and 2-metoxyethyl acrylate may be used.

When synthesizing such a polymer, it is difficult to control the molecular weight by using a general polymerization method. Therefore, it is preferable to make the molecular weight aligned by using a polymerization method that does not make the molecular weight too high. Such a polymerization method which can be preferably used for the present invention includes: a method using a peroxide polymerization initiator such as a cumene peroxide or t-butyl hydroperoxide, a method using more amount of initiator than usual, a method using a chain transfer agent such as a mercapto compound or carbon tetrachloride in addition to a polymerization initiator, a method using a polymerization terminator such as a benzoquinone or dinitrobenzene in addition to a polymerization initiator, and a massive polymerization method using a polymerization catalyst containing a compound having a thiol group and secondary hydroxy groups or a combination of the compound and an organic metal compound, as disclosed in Patent Document JP2000-128911A or JP2000-344823A.

The weight average molecular weight of the polymer X of the invention may be adjusted according to a known molecular weight adjusting method. For example, the method is an addition of a chain transfer agent such as a carbon tetrachloride, laurylmercaptan, or octyl thioglycolate. Or it may be adjusted by adjusting a polymerization temperature, which is generally from the room temperature to 130° C. and preferably 50° C. to 100° C., or polymerization time.

The weight average molecular weight may be measured by the molecular weight measurement method described above.

An amount of the polymer X added to the film is adjusted appropriately for imparting desired capability to the film. It may be added for reducing fluctuations of a photoelastic coefficient and a phase difference value against the moisture in an environment and a small amount of the polymer X may be added for improving phase difference property. If it was added too little, when used for a liquid crystal television as a phase difference film, fluctuation of a viewing angle or change of color touch due to a change of the phase difference value from the initial value may occur as well as corner unevenness which is a phenomenon that colors at the corners differ. On the other hand, if it was added too much, the necessary phase difference capability would not be obtained. As a result, the content of the polymer X is preferably 1% to 50% by mass.

The phase difference film of the invention may be a monolayer film or laminated film which multiple layers are stacked.

(Saccharide-Carboxylic Acid Ester Compound)

The phase difference film of the invention may contain a saccharide-carboxylic acid ester compound as necessary. The "saccharide-carboxylic acid ester compound" means a compound having an ester bond derived from a hydroxy group of a saccharide and a carboxy group of a carboxylic acid.

The saccharide-carboxylic acid ester compound is not limited but an octanol-water partition coefficient (it may be designated as "log P" hereinafter) may be preferably 7 or more and less than 11 from the viewpoint of its compatibility with the cellulose ester.

The log P value may be measured by a shake flask method described in JIS Z-7260-107 (2000). The log P may be estimated by a chemical computation method or an empirical method instead of the actual measurement.

A preferable computation method is Crippen's fragmentation method (J. Chem. Inf. Comput. Sci., vol 27. p 21 (1987)), Viswanadhan's fragmentation method (J. Chem. Inf. Comput. Sci., vol 29. p 163 (1989)), Broto's fragmentation method (Eur. J. Med. Chem.-Chim. Theor., vol. 19, p 71 (1984)) or CLogP method (reference: Leo, A., Jow, P. Y. C., Silipo, C., Hansch, C., J. Med. Chem., 18,865 (1975)) and the Crippen's fragmentation method (J. Chem. Inf. Comput. Sci., vol 27. p 21 (1987)) is more preferable.

The saccharide-carboxylic acid ester compound is preferably an ester compound having 1 to 12 of at least one of a pyranose structure and a furanose structure, and a part of the OH groups of the structures are esterified. More preferably, the esterification ratio is 70% or more.

Examples of the ester compound of the invention are listed below without intention to limit the invention.

The examples are glucose, galactose, mannose, fructose, xylose, arabinose, lactose, sucrose, nystose, 1F-fractcylnystose, stachyose, maltitol, lactitol, lactulose, cellobiose, maltose, cellotriose, maltotriose, raffinose and kestose.

In addition, gentiobiose, gentiotriose, gentiotetraose, xylotriose and galactocylsucrose may be used.

Among them, a compound having both of the pyranose structure and the furanose structure is preferable. They are sucrose, kestose, nystose, 1F-fractcylnystose and stachyose, and sucrose is more preferable.

Any monocarboxylic acid may be used to esterify all or a part of the OH groups in the pyranose structure or the furanose structure without limitation and known aliphatic monocarboxylic acid, alicyclic monocarboxylic acid or aromatic monocarboxylic acid may be used. A kind of carboxylic acid may be used alone or two or more carboxylic acids may be used in combination.

Preferable aliphatic monocarboxylic acid is a saturated aliphatic acid such as an acetic acid, propionic acid, butylic acid, iso-butylic acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanoic acid, melissic acid and lacceric acid, and an unsaturated aliphatic acid such as an undecenoic acid, oleic acid, sorbic acid, linoleic acid, linolenic acid, arachidonic acid and octenoic acid.

Preferable alicyclic monocarboxylic acid is a cyclopentane carboxylic acid, cyclohexane carboxylic acid, cyclooctane carboxylic acid or derivatives thereof.

Preferable aromatic monocarboxylic acid is a benzoic acid, those having an alkyl group or alkoxy group in a benzene ring of a benzoic acid such as a toluoylic acid, cinnamic acid, or those having two or more benzene rings such as a benzilic acid, biphenyl carboxylic acid, naphthalene carboxylic acid or tetralin carboxylic acid, or derivatives thereof. Preferable examples are xylix acid, hemellitic acid, mesitylenic acid, prehnitylic acid, γ-isodurylic acid, durylic acid, mesitoic acid, α-isodurylic acid, cuminic acid, α-toluoylic acid, hydroatropic acid, atropic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratoric acid, o-veratoric acid, gallic acid, asaronic acid, mandelic acid, homoanisic acid, homovanillic acid, homoveratoric acid, phthalonic acid and p-coumaric acid. Particularly, a benzoic acid or naphthylic acid is preferable.

The ester compound having 1 to 12 of pyranose structures and/or furanose structures according to the invention may be an esterified compound of an oligosaccharide.

An oligosaccharide is synthesized from starch, sucrose or the like through enzyme action such as amylase. The oligosaccharide applicable to the invention is, for example, maltooligosaccharide, isomaltooligosaccharide, fructooligosaccharide, galactooligosaccharide and xylooligosaccharide.

The esterified compound is a compound in which 1 to 12 of at least one type of a pyranose structure and a furanose structure are condensed as shown by the following general formula (A). In the formula, $R_{11}$ to $R_{15}$ and $R_{21}$ to $R_{25}$ represent C2 to C22 acyl group or hydrogen atom, m and n each represent an integer of 0 to 12, and m+n is 1 to 12.

(Chemical 1)

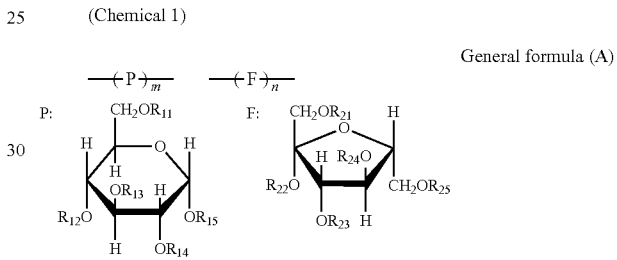

General formula (A)

Preferably each of $R_{11}$ to $R_{15}$ and $R_{21}$ to $R_{25}$ is a benzoyl group or a hydrogen atom.

The benzoyl group may have a substituent R26 and it may be an alkyl group, alkenyl group, alkoxy group or phenyl group. The alkyl group, alkenyl group, alkoxy group or phenyl group may further have a substituent. The oligosaccharide may be synthesized by the same method as that for the esterified compound of the invention.

Followings are examples of the esterified compound of the invention but the invention is not limited thereto.

(Chemical 2)

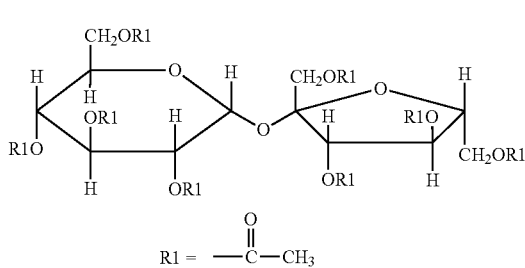

A-1

AVERAGE DEGREE OF SUBSTITUTION 2.0

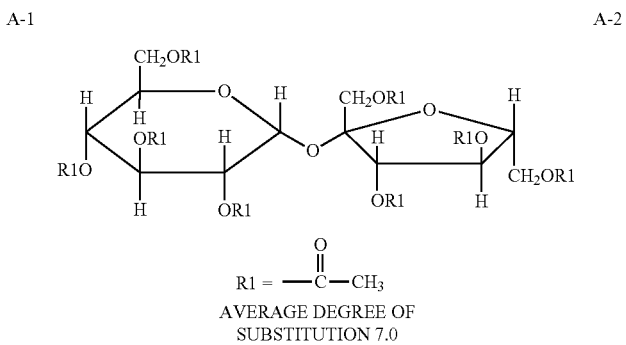

A-2

AVERAGE DEGREE OF SUBSTITUTION 7.0

-continued
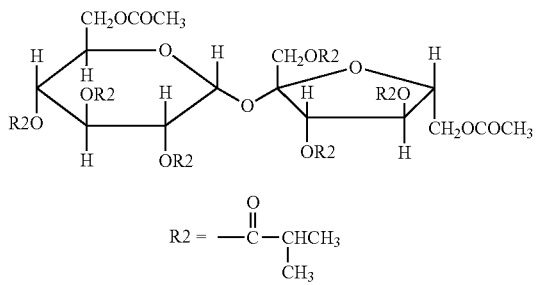
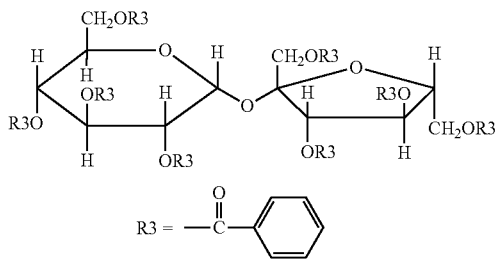
(Chemical 3)
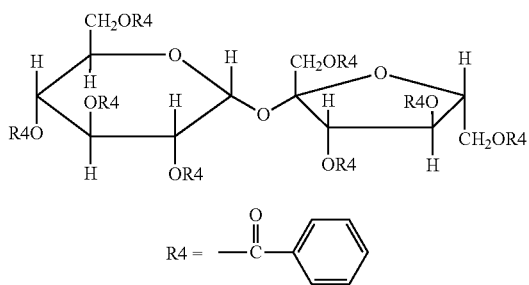
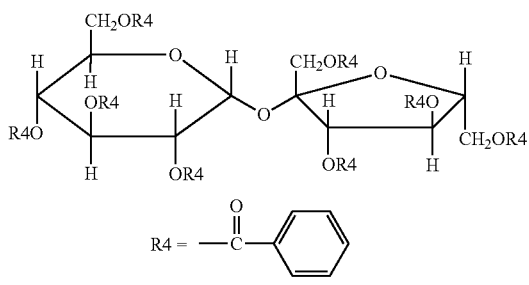
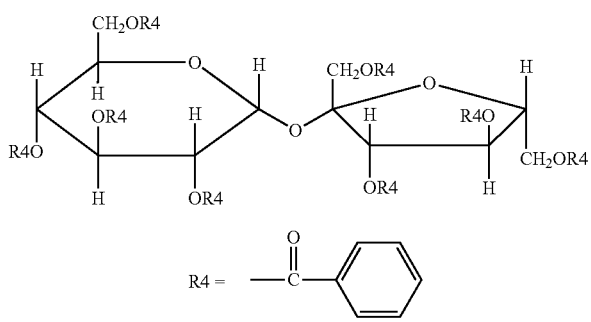
(Chemical 4)
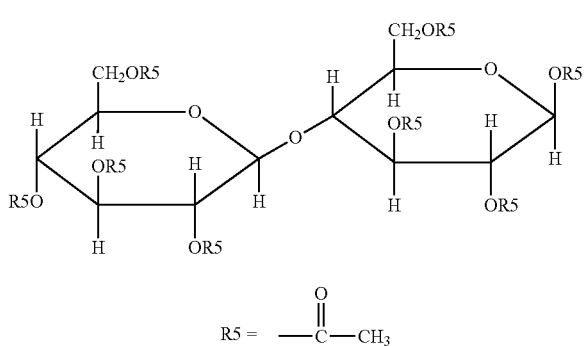

-continued
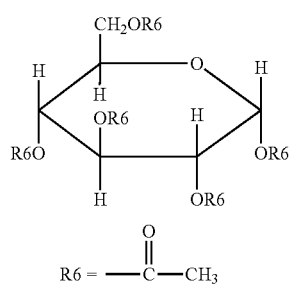
A-9
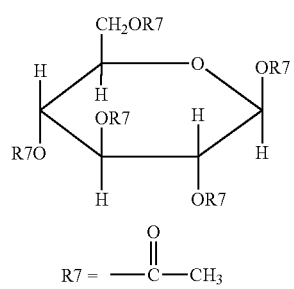
A-10
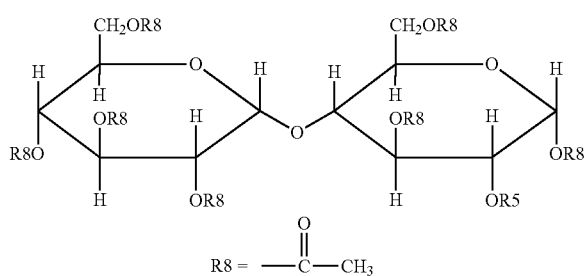
A-11
(Chemical 5)
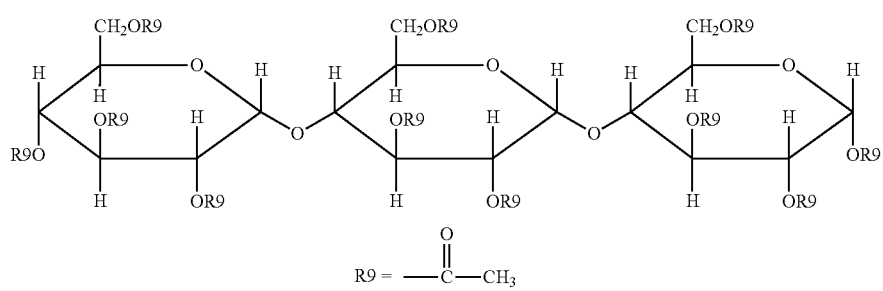
A-12
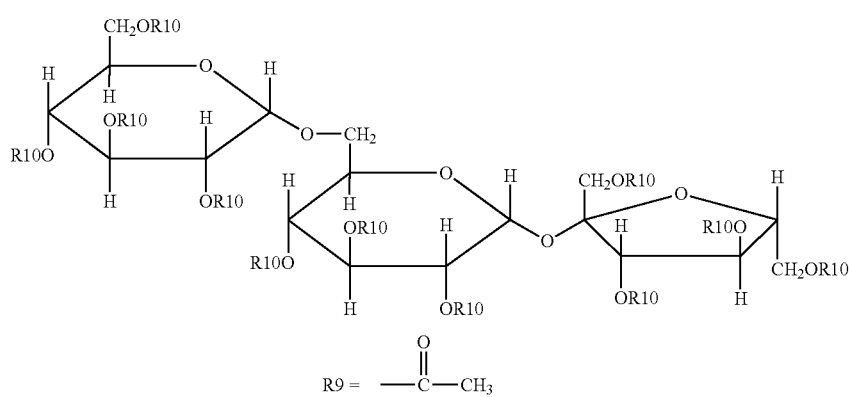
A-13

(Chemical 6)
A-14
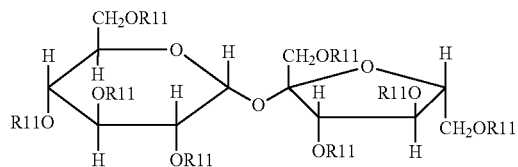
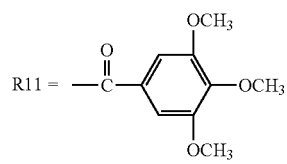
A-15
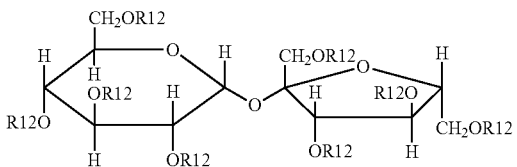
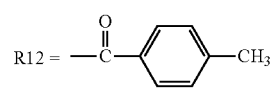
AVERAGE DEGREE OF SUBSTITUTION 8.0
A-16
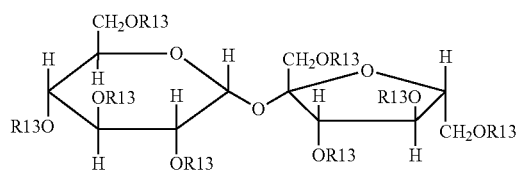
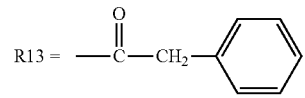
A-17
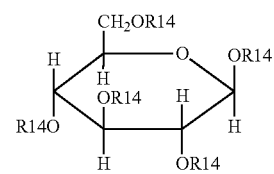
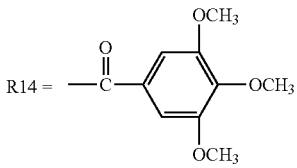
(Chemical 7)
A-18
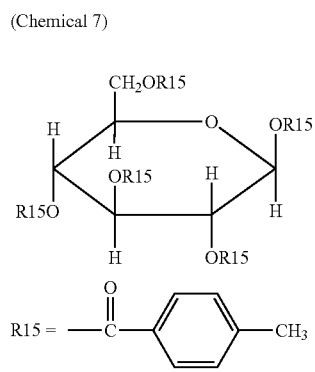
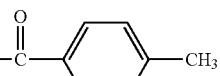
A-19
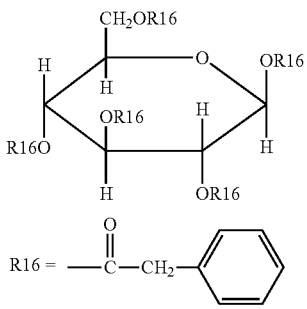
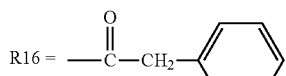
A-20
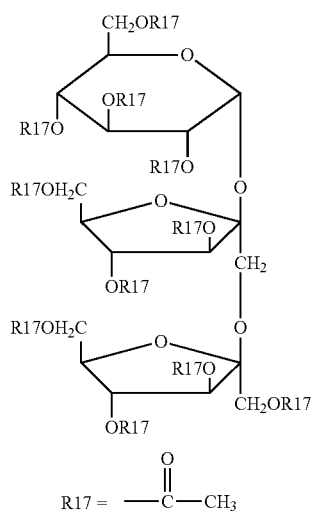
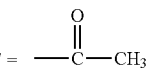

(Chemical 8)
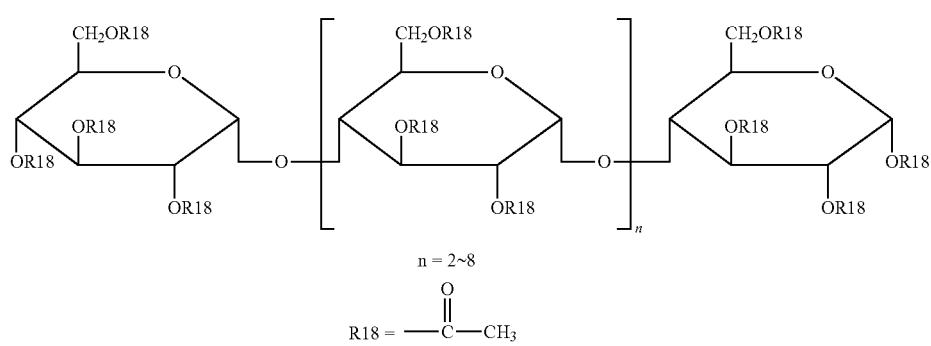
A-21
n = 2~8
R18 = $-\overset{O}{\underset{\|}{C}}-CH_3$
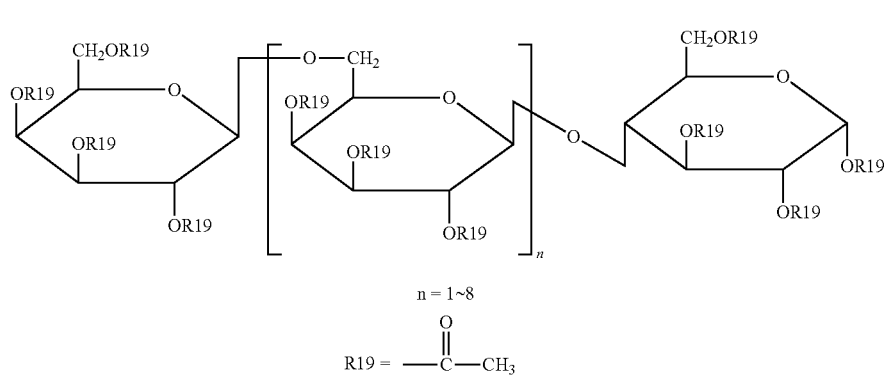
A-22
n = 1~8
R19 = $-\overset{O}{\underset{\|}{C}}-CH_3$
(Chemical 9)
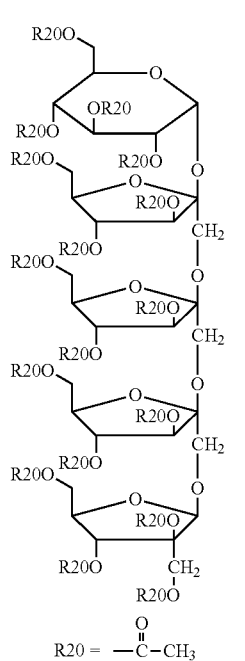
A-23
R20 = $-\overset{O}{\underset{\|}{C}}-CH_3$ (Chemical 10)

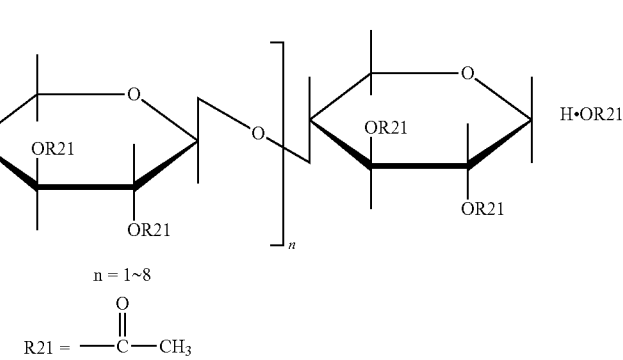

A-24

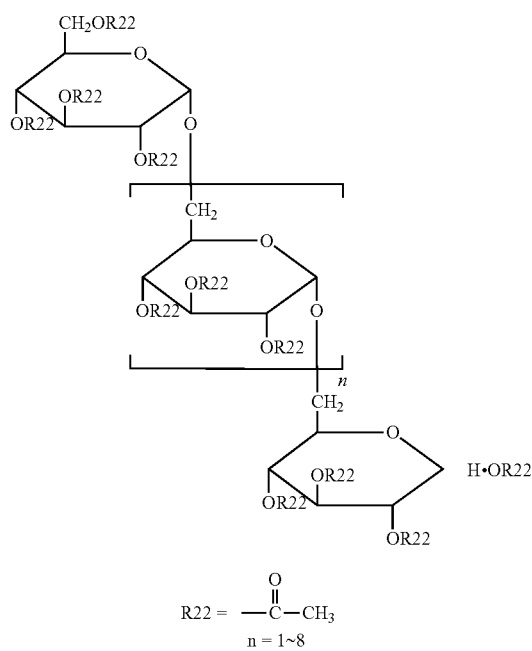

A-25

The cellulose ester film of the invention preferably contains a saccharide-carboxylic acid ester compound by 1 to 50% by mass with respect to the cellulose ester film and more preferably contains 2 to 15% by mass.

(Phase Difference Adjusting Agent)

The phase difference film of the invention may be added with a phase difference adjusting agent (also referred to as a "retardation adjusting agent").

Although any type of a phase difference adjusting agent is applicable, the compound preferable has a log P of zero or more and less than 7. The phase difference adjusting agent is required to have an adequate solubility corresponding to a resin. When the cellulose ester of the invention have a log P smaller than zero, an orientation of the compound might be fluctuated due to high water solubility, and when it have a log P of 7 or more, an orientation of the compound might be reduced and would not obtain desired phase difference, both of which are not preferable.

The phase difference adjusting agent for the invention may be preferably an ester compound represented by a general formula (B) below.

B-(G-A)$_n$-G-B      General formula (B):

where A represents C4-C12 alkylene dicarboxylic acid residue or C6-C12 aryl dicarboxylic acid residue, B represents hydroxy group or carboxylic acid residue, G represents C2-C12 alkylene glycol residue, C6-C12 aryl glycol residue or C4-C12 oxyalkylene glycol residue, and n represents an integer of 1 or larger.

The formula (B) is composed of a hydroxy group or carboxylic acid residue represented by B, an alkylene glycol residue, aryl glycol residue or oxyalkylene glycol residue represented by G and an alkylene dicarboxylic acid residue or aryl dicarboxylic acid residue represented by A, and the compound may be synthesized by a synthesizing method for a general ester compound.

An example of a carboxylic acid component represented by B in the formula (B) may be an acetic acid, propionic acid, butyric acid, benzoic acid, p-tertiary butylbenzoic acid, o-toluoylic acid, m-toluoylic acid, p-toluoylic acid, dimethylbenzoic acid, ethylbenzoic acid, n-propylbenzoic acid, aminobenzoic acid, acetoxybenzoic acid or fatty acid, and they may be used alone or as a mixture of two or more compounds.

An example of a C2-C12 alkylene glycol component represented by G in the formula (B) may be an ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol or 1,12-octadecanediol. An example of a C4-C12 oxyalkylene glycol component may be a diethylene glycol, triethylene glycol, tetraethylene glycol, dipropylene glycol or tripropylene glycol. These glycols may be used alone or as a mixture of two or more compounds. Particularly, C2-C12 alkylene glycol is preferable due to its excellent compatibility with a cellulose ester.

An example of a C4-C12 alkylene dicarboxylic acid component represented by A in the formula (B) may be succinic acid, maleic acid, fumaric acid, glutaric acid, adipic acid, azelaic acid, sebacic acid or dodecane dicarboxylic acid, and they may be used alone or as a mixture of two or more compounds. An example of a C6-C12 arylene dicarboxylic acid component may be a phthalic acid, terephthalic acid, isophthalic acid, 1,5-naphthalene dicarboxylic acid or 1,4-naphthalene dicarboxylic acid.

The ester compound represented by the formula (B) preferably has a number average molecular weight of 300 to 2000, and more preferably 400 to 1500. The acid value may be 0.5 mgKOH/g or smaller and the hydroxy group value is 25 mgKOH/g or smaller, and more preferably the acid value is 0.3 mgKOH/g or smaller and the hydroxy group value is 15 mgKOH/g or smaller.

Specific examples of the ester compound represented by the formula (B) used for the invention are listed below without an intention to limit the invention.

(Chemical 11)

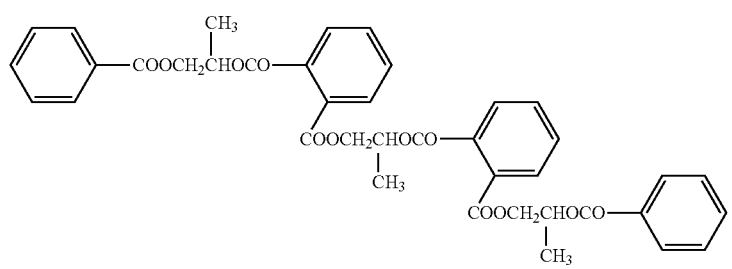

B-1

Mw: 696

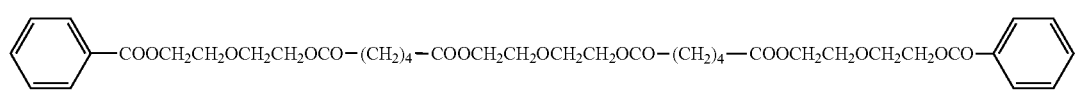

B-2

Mw: 746

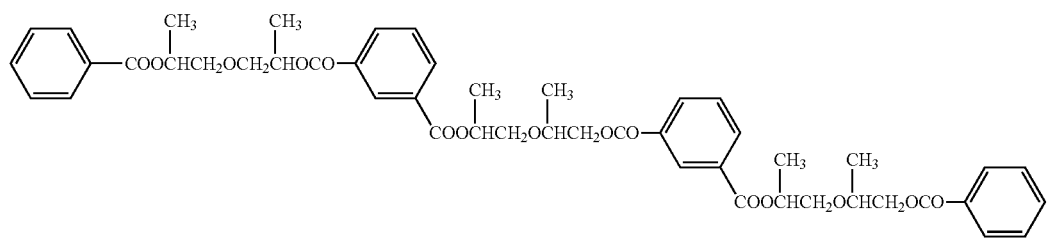

B-3

Mw: 830

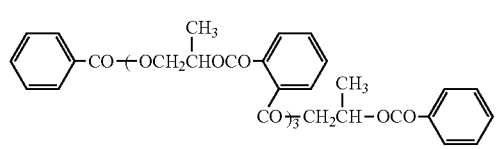

B-4

Mw: 886

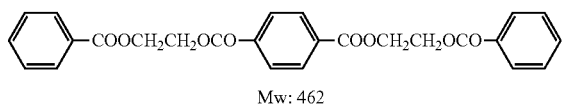

B-5

Mw: 462

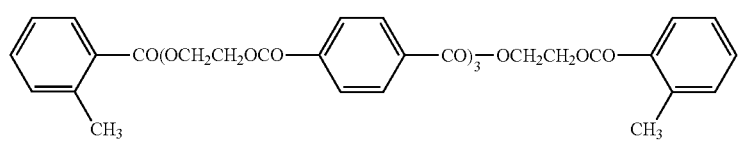

B-6

Mw: 874

(Chemical 12)
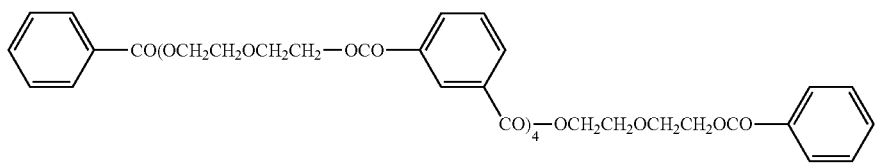
B-7
Mw: 1258
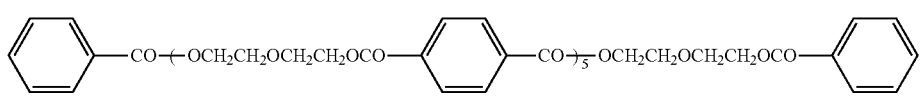
B-8
Mw: 1494
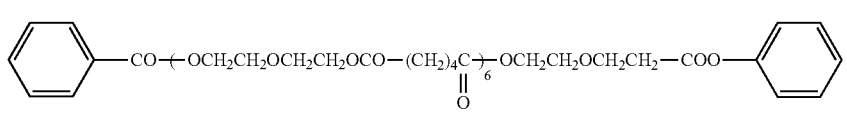
B-9
Mw: 1394
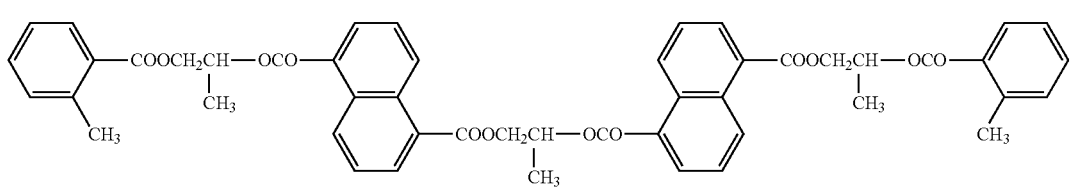
B-10
Mw: 852
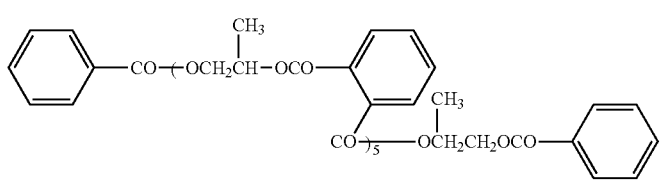
B-11
Mw: 1314
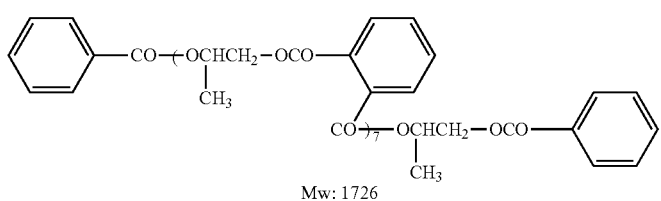
B-12
Mw: 1726
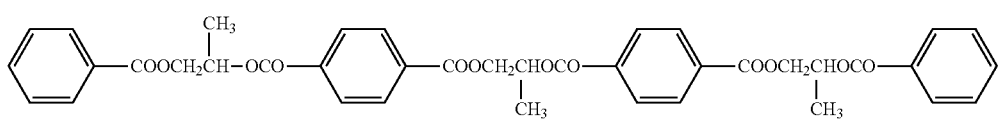
B-13
Mw: 696

(Chemical 13)

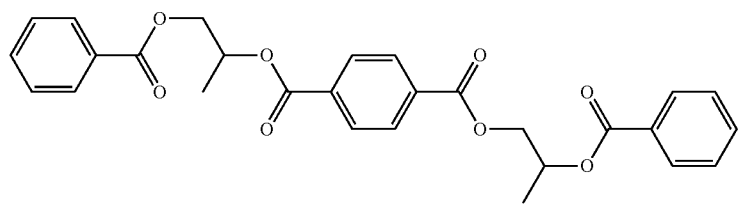

B-14

Mw: 491

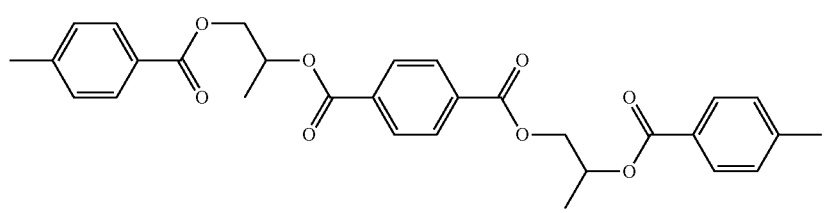

B-15

Mw: 519

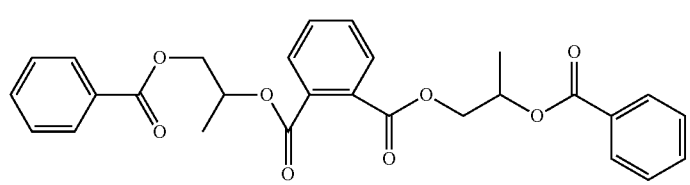

B-16

Mw: 491

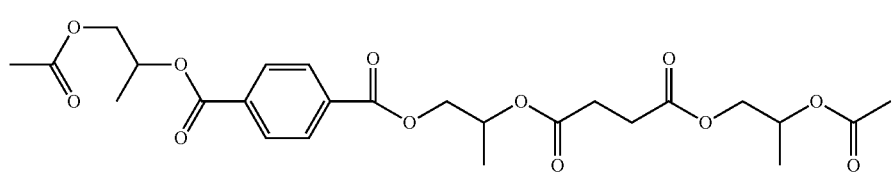

B-17

Mw: 510

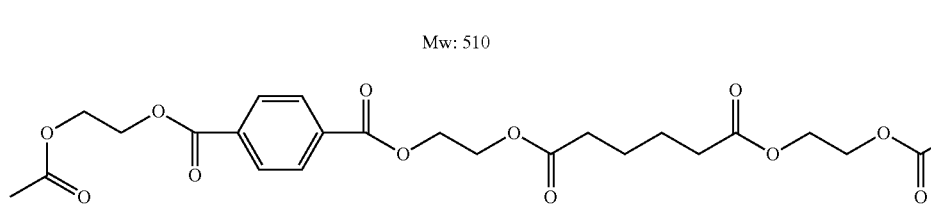

B-18

Mw: 525

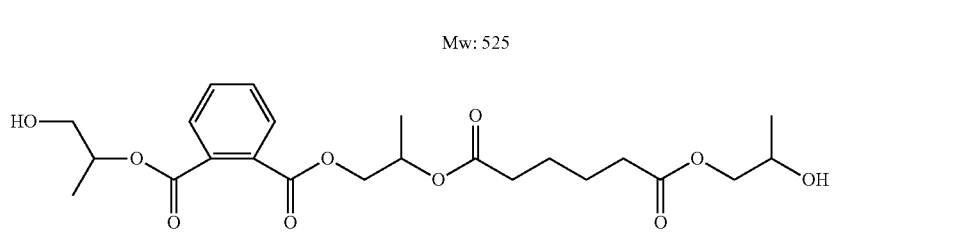

B-19

Mw: 469

The phase difference film of the invention may preferably contain the phase difference adjusting agent by 0.1 to 30% by mass with respect to the cellulose ester film, and more preferably 0.5 to 10% by mass.

(Plasticizer)

The phase difference film of the invention may contain a plasticizer as necessary. The plasticizer to be added is not limited but may be a polyhydric alcohol ester-based plasticizer, polycarboxylic acid ester-based plasticizer, glycolate-based plasticizer, phosphoric acid-based plasticizer, phthalic acid ester-based plasticizer, fatty acid ester-based plasticizer and acrylic polymer. An amount of phosphoric acid-based plasticizer to be added may be 6% or smaller by mass from the viewpoint of endurance of degree of polarization.

The plasticizer preferably has the Td1 temperature, which the weight is decreased in 1%, of 250° C. or more and more preferably 280° C. or more, and particularly preferably 300° C. or more. It becomes possible to suppress degradation of surface quality and fluctuation of characteristics which is caused by volatilization of the plasticizer during a production process when the Td1 temperature is within this range.

The polyhydric alcohol ester-based plasticizer is a plasticizer composed of an ester of a two or more-valence aliphatic polyhydric alcohol and a monocarboxylic acid, and preferably the ester contains an aromatic ring or a cycloalkyl ring. The ester is preferably an ester of a 2 to 20-valence aliphatic polyhydric alcohol.

The preferred polyhydric alcohol used for the present invention is represented by a following general formula (a).

$$R_1\text{—}(OH)_n \qquad \text{General formula (a):}$$

where $R_1$ is an n-valent organic group, n is a positive integer of 2 or greater, and OH is an alcoholic hydroxy group or phenoric hydroxy group.

Examples of the preferred polyhydric alcohol are as listed below but the invention is not limited thereto.

Adonitol, arabitol, ethylene glycol, diethylene glycol, triethylene glycol, tetraethylene glyol, 1,2-prpanediol, 1,3-prpanediol, dipropylene glycol, tripropylene glycol, 1,2-butanediol, 1,3-butanediol, 1,4-butanediol, dibutyleneglycol, 1,2,4-butanetriol, 1,5-pentanediol, 1,6-hexanediol, hexanetriol, glycerin, diglycerin, galactitol, inositol, mannitol, 3-methylpentane-1,3,5-triol, pinacol, sorbitol, trimethylol propane, trimethylol ethane, pentaerythritol, dipentaerythritol and xylitol. Particularly, triethylene glycol, tetraethylene glyol, dipropylene glycol, tripropylene glycol, sorbitol, glycerin, trimethylol ethane, trimethylol propane, pentaerythritol and xylitol are preferable.

A monocarboxylic acid for the polyhydric alcohol ester is not limited and known aliphatic monocarboxylic acids, alicyclic monocarboxylic acids, aromatic carboxylic acids or the like may be used. The alicyclic monocarboxylic acid or aromatic carboxylic acid is preferable so as to improve water transmission rate and retainability.

Examples of the preferred monocarboxylic acids are as listed below but the invention is not limited thereto.

The aliphatic monocarboxylic acid for the invention is preferably a fatty acid having a straight chain or a side chain having 1 to 32 carbon atoms. The number of carbon atoms is preferably 1 to 20 and more preferably 1 to 10. An acetic acid is preferable because it improves compatibility with cellulose ester. It is also preferable to use acetic acid with other monocarboxylic acid. Preferable aliphatic monocarboxylic acid is a saturated fatty acid such as an acetic acid, propionic acid, butyric acid, valeric acid, caproic acid, enanthic acid, caprylic acid, pelargonic acid, capric acid, 2-ethyl-hexanic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanoic acid, melissic acid and lacceric acid, and an unsaturated fatty acid such as an undecylenic acid, oleic acid, sorbic acid, linoleic acid, linolenic acid and arachidonic acid. Preferred alicyclic monocarboxylic acid is a cycloalkyl group having 3 to 8 carbon atoms. Specific preferred alicyclic monocarboxylic acid is a cyclopentane carboxylic acid, cyclohexane carboxylic acid, cyclooctane carboxylic acid or derivatives thereof. Preferable aromatic monocarboxylic acid is a benzoic acid, those having 1 to 3 of alkyl groups or alkoxy groups such as a methoxy group or ethoxy group in a benzene ring of a benzoic acid such as a toluoylic acid, or those having two or more benzene rings such as a biphenyl carboxylic acid, naphthalene carboxylic acid or tetralin carboxylic acid, or derivatives thereof. Particularly, a benzoic acid is preferable.

The molecular weight of the polyhydric alcohol ester is not limited but preferably 300 to 1500 and more preferably 400 to 1000. A larger molecular weight is preferable because it imparts less volatility and a smaller molecular weight is preferable because it imparts superior water transmission rate and compatibility with a cellulose ester. The polyhydric alcohol ester may be composed by single kind of monoarboxylic acid or two or more kinds of monoarboxylic acids may be used in combination. All of the OH groups in the polyhydric alcohol may be esterified or a part of the OH groups may be retained. The polyhydric alcohol ester may be synthesized by a known method. The methods are, for example, condensation esterifying of the monocarboxylic acid and the polyhydric alcohol under the presence of acid, reacting the polyhydric alcohol with an acid chloride or acid anhydride which is converted from organic acid in advance, and reacting the polyhydric alcohol with a phenylester of an organic acid. It may be preferable to choice a method achieving high yield for the esterified compound to be synthesized.

Examples of the specific polyhydric alcohol ester are as follows.

(Chemical 14)

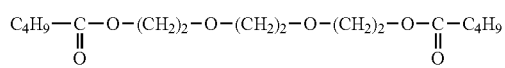

1

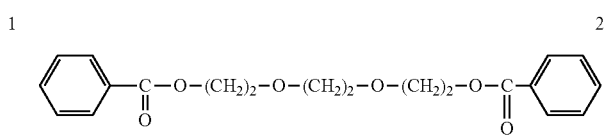

2

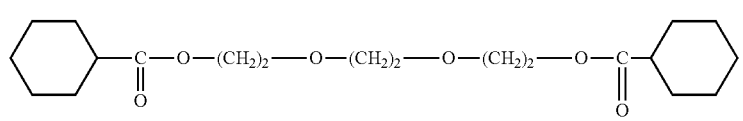

3

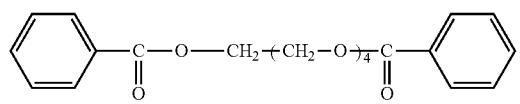

4

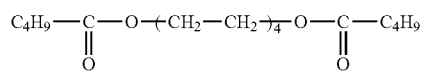

5

-continued
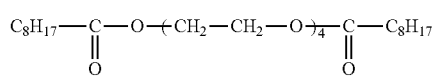
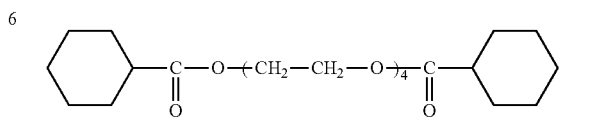
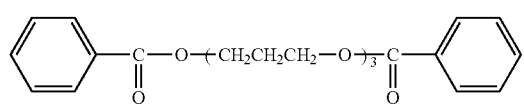
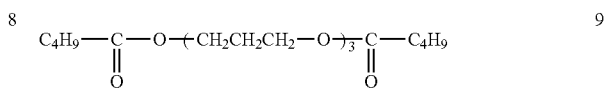
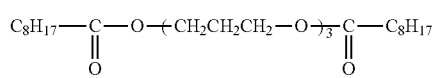
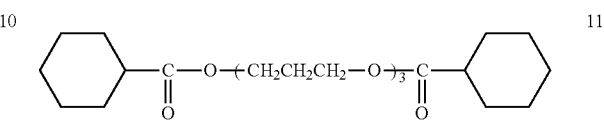
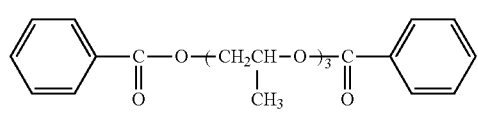
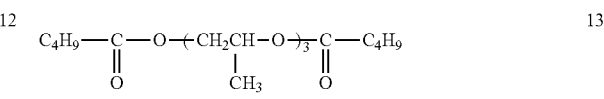
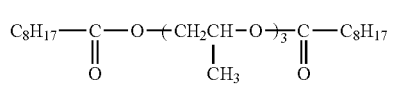
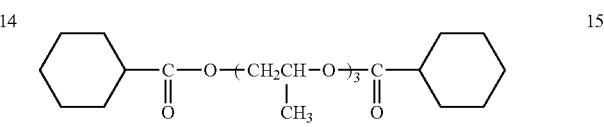
(Chemical 15)
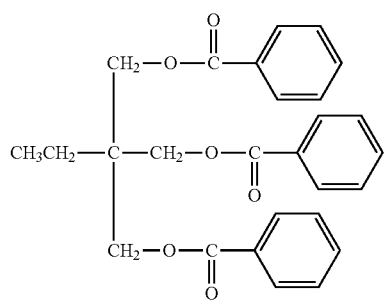
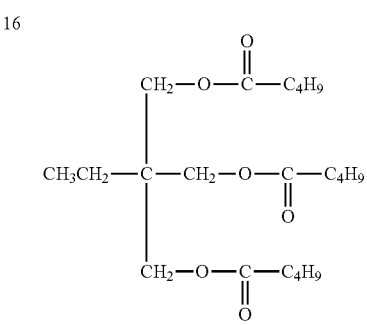
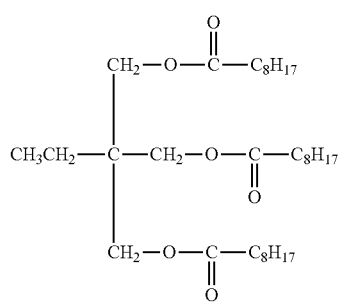
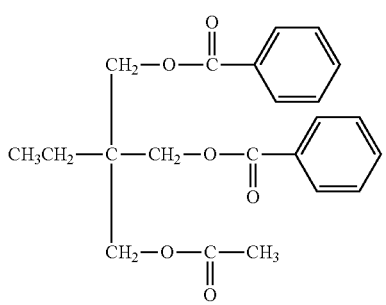
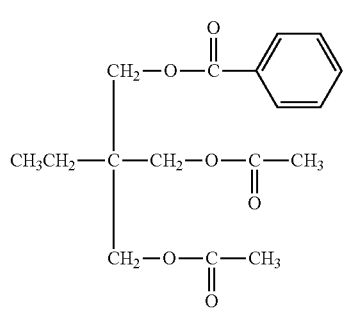
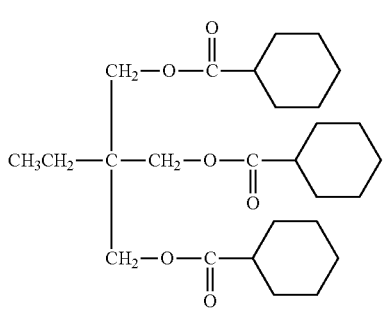

-continued
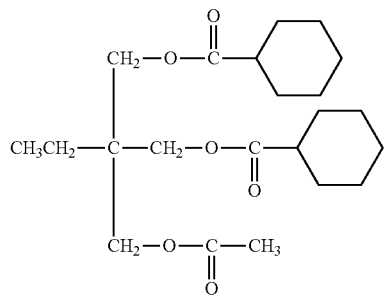
(Chemical 16)
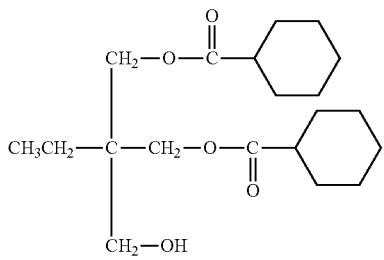
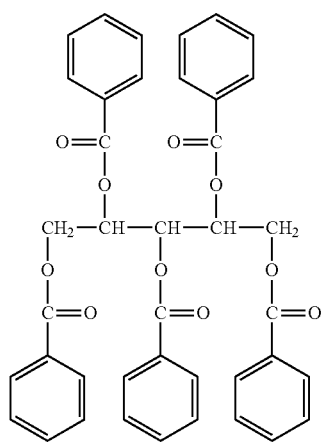
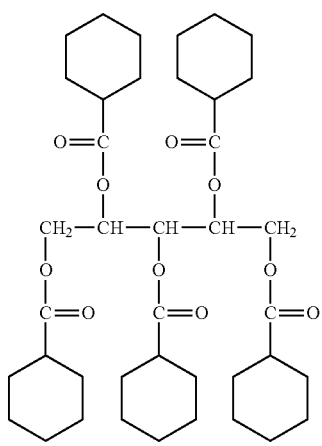
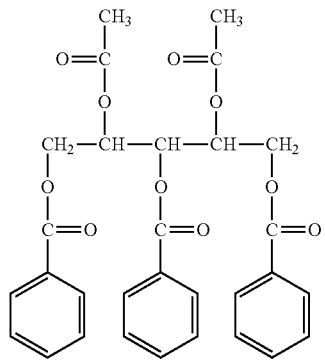
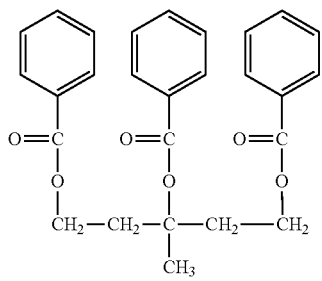
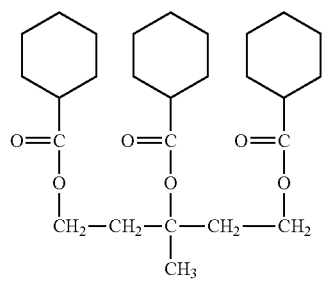
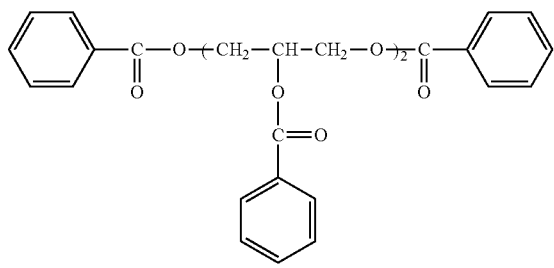

(Chemical 17)

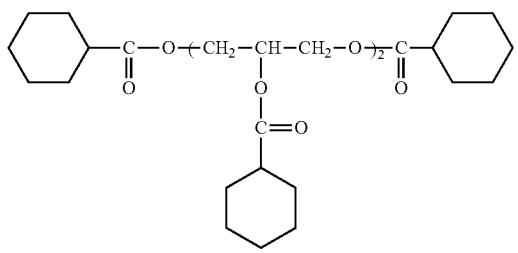

30

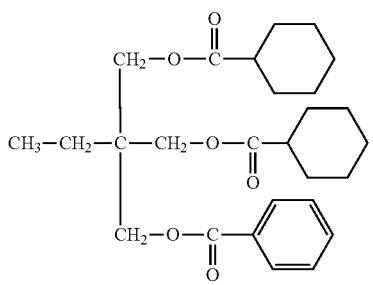

31

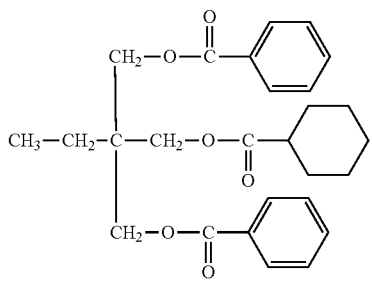

32

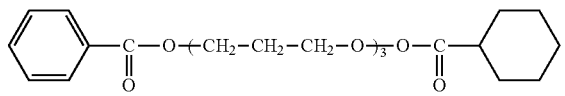

33

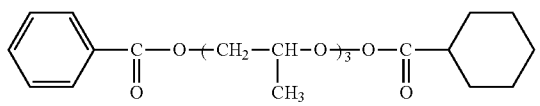

34

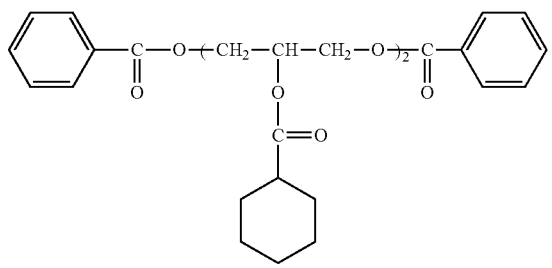

35

The polyvalent carboxylic acid ester compound is composed of an alcohol and at least divalent, preferably divalent to 20-valent carboxylic acid. An aliphatic polyvalent carboxylic acid is preferably divalent to 20-valent, and aromatic or alicyclic polyvalent carboxylic acid is preferably trivalent to 20-valent.

The polyvalent carboxylic acid is represented by a following general formula (c).

$$R_2(COOH)_m(OH)_n \quad \text{General formula (c):}$$

where R2 is a (m+n)-valent organic group, m is an integer of 2 or larger, n is an integer of zero or larger, COOH group is a carboxy group, and OH group is a phenolic or alcoholic hydroxy group.

Examples of preferable polyvalent carboxylic acid are as follows but the invention is not limited thereto.

An aromatic, at least trivalent, carboxylic acid such as trimellitic acid, trimesic acid, piromellitic acid, or derivative thereof, an aliphatic polyvalent carboxylic acid such as succinic acid, adipic acid, azelaic acid, sebacic acid, oxalic acid, fumaric acid, maleic acid or tetrahydrophthalic acid, or a polyvalent oxycarboxylic acid such as tartaric acid, tartronic acid, malic acid or citric acid. Particularly, a polyvalent oxycarboxylic acid is preferable for improving retainability.

An alcohol used for synthesizing the polyvalent carboxylic acid ester compound of the invention is not limited and any known alcohols and phenols may be used. For example, aliphatic saturated or unsaturated alcohols having C1 to C32 straight chain or side chain may be preferably used. Preferably the number of carbon atoms is 1 to 20 and more preferably 1 to 10.

An alicyclic alcohol such as cyclopentanol or cyclohexanol or derivatives thereof, and an aromatic alcohol such as benzyl alcohol or cinnamyl alcohol, or derivatives thereof may be also preferable.

When using a polyvalent oxycarboxylic acid as a polyvalent carboxylic acid, the alcoholic or phenolic hydroxy group of the polyvalent oxycarboxylic acid can be esterified by a monocarboxylic acid. Examples of preferable monocarboxylic acids are as follows, but the invention is not limited thereto.

A fatty acid having C1 to C32 straight chain or side chain may be used as an aliphatic monocarboxylic acid. Preferably the number of carbon atoms is 1 to 20 and more preferably 1 to 10.

Examples of preferable aliphatic monocarboxylic acids are saturated aliphatic acids such as an acetic acid, propionic acid, butylic acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanoic acid, melissic acid and lacceric acid, and unsaturated aliphatic acids such as an undecylenic acid, oleic acid, sorbic acid, linoleic acid, linolenic acid and arachidonic acid.

Examples of preferable alicyclic monocarboxylic acids are cyclopentane carboxylic acid, cyclohexane carboxylic acid, cyclooctane carboxylic acid and derivatives thereof.

Examples of preferable aromatic monocarboxylic acids are benzoic acid, those having an alkyl group in a benzene ring of a benzoic acid such as toluylic acid, aromatic monocarboxylic acids having two or more benzene rings such as biphenyl carboxylic acid, naphthalene carboxylic acid and tetralin carboxylic acid, and derivatives thereof. Particularly benzoic acid is preferable.

The molecular weight of the polyvalent oxycarboxylic acid ester compound is not limited but preferably 300 to 1000 and more preferably 350 to 750. A larger molecular weight is preferable because it improves retainability and a smaller molecular weight is preferable because it imparts superior water transmission rate and compatibility with a cellulose ester.

The alcohol used for synthesizing the polyvalent oxycarboxylic acid ester of the invention may be a single component or mixture of two or more kinds of alcohols. Preferable examples of the polyvalent oxycarboxylic acid ester compounds are listed below without an intention to limit the invention thereto.

A dibutyl tartrate, diacetyldibutyl tartrate, triethyl citrate, tributyl citrate, acetyltriethyl citrate (ATEC), acetyltributyl citrate (ATBC), benzoyltributyl citrate, acetyltriphenyl citrate, acetyltribenzyl citrate, tributyl trimesate, trihexyl trimesate, tri-2-ethylhexyl trimesate, tricyclohexyl trimesate, tributyl trimellitate, trihexyl trimellitate, tri-2-ethylhexyl trimellitate, tricyclohexyl trimellitate, tetrabutyl pyromellitate, tetrahexyl pyromellitate, tri-2-ethylhexyl pyromellitate and tetracyclohexyl pyromellitate.

A glycolate-based plasticizer is not limited and an alkylphthalyl alkylglycolate-based plasticizer is preferably used.

Examples of the alkylphthalyl alkylglycolates are methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalyl methylglycolate, ethylphthalyl propylglycolate, methylphthalyl butylglycolate, ethylphthalyl butylglycolate, butylphthalyl methylglycolate, butylphthalyl ethylglycolate, propylphthalyl butylglycolate, butylphthalyl propylglycolate, methylphthalyl octylglycolate, ethylphthalyl octylglycolate, octylphthalyl methylglycolate and octylphthalyl ethylglycolate.

Examples of a phosphate-based plasticizer are triphenyl phosphate, tricresyl phosphate, cresyldiphenyl phosphate, octyldiphenyl phosphate, diphenylbiphenyl phosphate, trioctyl phosphate, tributyl phosphate, 1,3-phenylene bis(dixylenyl phosphate) and 1,3-phenylene bis(diphenyl phosphate).

Examples of a phthalate-based plasticizer are diethyl phthalate, dimethoxyethyl phthalate, dimethyl phthalate, dioctyl phthalate, dibutyl phthalate, butylbenzyl phthalate, di-2-ethylhexyl phthalate, dicyclohexyl phthalate and dicyclohexyl terephthalate.

Examples of a fatty acid ester-based plasticizer are butyl oleate, methylacetyl ricinoleate and dibutyl sebacate.

An epoxidated oil-based plasticizer may be also used.

(UV Absorber)

The phase difference film of the invention may contain a UV absorber. The purpose of the UV absorber is to enhance durability by absorbing UV ray having a wavelength of 400 nm or smaller. The transmittance at a wavelength of 370 nm is preferably 10% or smaller, more preferably 5% or smaller and further preferably 2% or smaller.

The UV absorber used for the invention is not limited, and examples are oxybenzophenone-based compounds, benzotriazole-based compounds, salicylic acid ester-based compounds, benzophenone-based compounds, cyanoacrylate-based compounds, triazine-based compounds, nickel complex salt-based compounds and inorganic powder.

Specific examples are 5-chloro-2-(3,5-di-sec-butyl-2-hydroxyphenyl)-2H-benzotriazole, (2-2H-benzotriazole-2-yl)-6-(straight or side chain dodecyl)-4-methylphenol, 2-hydroxy-4-benzyloxybenzophenone and 2,4-benzyloxybenzophenone, and commercially available products named Tinuvin such as Tinuvin 109, Tinuvin 171, Tinuvin 234, Tinuvin 326, Tinuvin 327 and Tinuvin 328 (all from BASF Japan Ltd.), all of them are preferably used.

UV absorbers preferably used for the invention are benzotriazole-based UV absorber, benzophenone-based UV absorber and triazine-based UV absorber, and benzotriazole-based UV absorber and benzophenone-based UV absorber are particularly preferable.

The polarizing plate protecting film according to the invention preferably contains two or more kinds of UV absorbers. A polymer-type UV absorber may be preferably used for the invention and particularly the polymer-type UV absorber described in JPH6-148430A may be preferably used.

Such a UV absorber may be dissolved in an organic solvent such as an alcohol such as methanol, ethanol and buthanol, methylene chloride, methyl acetate, acetone, or dioxolane or a mixture thereof and then the solution is added to a dope, or the UV absorber may be added directly to a dope composition.

A UV absorber that is not dissolved in an organic solvent such as an inorganic powder may be dispersed in an organic solvent and cellulose acetate using a dissolver or sandmill and the dispersion can be added in a dope.

An amount of a UV absorber depends on the type or use conditions of the absorber. When a thickness of a polarizing plate protecting film is 30 to 200 μm, the amount of UV absorber is preferably 0.5 to 10% by mass relative to the polarizing plate protecting film and more preferably 0.6 to 4% by mass.

(Antioxidant)

An antioxidant is referred to as a deterioration prevention agent and it is preferable to add such an antioxidant so as to delay or suppress film degradation caused by halogens in a remaining solvent or phosphoric acid of phosphoric-based plasticizer contained in the film.

The antioxidant is preferably a hindered phenol-based compound such as 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thiodiethylene bis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene or tris(3,5-di-t-butyl-4-hydroxybenzyl)-isocyanulate.

Particularly preferable antioxidants are 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate]. It is also preferable to use a hydrazine-based metal deactivator such as N,N'-bis[3-(3,5-di-t-butyl-4-hydroxyphenyl)propionyl]hydrazine or a phosphorus-containing processing stabilizer such as tris(2,4-di-t-butylphenyl)phosphite in combination.

Amount of addition of these compounds is preferably 1 ppm to 1.0% by mass and more preferably 10 to 1000 ppm, relative to the mass of the cellulose ester.

(Fine Particles)

The phase difference film of the invention preferably contain inorganic fine particles such as silicon dioxide, titanium dioxide, aluminum oxide, zirconium oxide, calcium carbonate, kaolin, talc, calcined calcium silicate, hydrated calcium silicate, aluminum silicate, magnesium silicate and calcium phosphate or fine particles of cross-linked polymers. Particularly silicon dioxide is preferable to reduce haze of a film.

Average primary particle size of the fine particle is preferably 20 nm or smaller, more preferably 5 to 16 nm and further preferably 5 to 12 nm.

The fine particles are contained in the phase difference film preferably in the form of secondary aggregate with a particle size of 0.1 to 5 μm. Preferable average diameter is 0.1 to 2 μm and more preferably 0.2 to 0.6 μm. By virtue of this, bumps and dips having a height about 0.1 to 1.0 μm are formed on a surface of the film, which imparts an appropriate slipping property on the surface of the film. The average primary particle size was determined by observation of 100 particles using a transmission electron microscope (500,000 to 2,000,000 magnifications). The measured diameters were averaged and defined as the average primary particle size.

An apparent specific gravity of the fine particles is preferably 70 g/l or more, more preferably 90 to 200 g/l and particularly preferably 100 to 200 g/l. The larger the apparent specific gravity is, the higher concentrated dispersion solution can be prepared and the haze and aggregation become better. Particularly, when preparing a dope of high solid content, such a solution is preferably used. Fine particles of silicon dioxide having an average primary particle size of 20 nm or less and a specific gravity of 70 g/l or more can be obtained by, for example, combustion of vaporized silicon tetrachloride with hydrogen at 1000 to 1200° C. in the air. Or such fine particles is available by the trade name of AEROSIL® 200V and AEROSIL® R972V (both from Japan Aerosil K.K.).

The above specific gravity was measured using a measuring cylinder to weigh predetermined volume of silicon dioxide and calculating according to a following equation.

Specific gravity (g/l)=mass of silicon dioxide (g)/volume of silicon dioxide (l).

Methods for preparing a dispersion solution of the fine particles used for the invention are as follows.

(Preparation Method A)

A solvent and fine particles are mixed and stirred, and dispersed by a disperser to obtain a fine particles dispersion solution. The fine particles dispersion solution is added to a dope and stirred.

(Preparation Method B)

A solvent and fine particles are mixed and stirred, and dispersed by a disperser to obtain a fine particles dispersion solution. A small amount of cellulose ester is added to another solvent and stirred to dissolve the cellulose ester. The fine particles dispersion solution is added to the cellulose ester-dissolved solution and mixed to obtain a fine particles additive solution. The fine particles additive solution is added to a dope and mixed with an inline mixer.

(Preparation Method C)

A small amount of cellulose ester is added to another solvent and stirred to dissolve the cellulose ester. The fine particles are added to the dissolved solution and dispersed using a disperser to obtain a fine particles additive solution. The fine particles additive solution is added to a dope and mixed with an inline mixer.

The preparation method A is superior to dispersibility of the silicon dioxide particles and the preparation method C is superior to preventing re-aggregation of the silicon dioxide particles. The preparation method B is superior to both of the dispersibility and preventing re-aggregation of the silicon dioxide particles and thus preferable.

(Dispersing Method)

A concentration of silicon dioxide in the dispersion solution with a solvent is preferably 5 to 30% by mass, more preferably 10 to 25% by mass and most preferably 15 to 20% by mass. The higher the dispersion concentration, the lower the turbidity of the liquid relative to an added amount is and thus preferable because the haze and aggregation become better.

The solvent is preferably a lower alcohol such as methyl alcohol, ethyl alcohol, propyl alcohol, isopropyl alcohol or butyl alcohol. The solvent other than the lower alcohols is not limited but it is preferable to use a solvent used for preparation of a film of cellulose ester.

An amount of silicon dioxide particles added to the cellulose ester is preferably 0.01 to 5.0 parts by mass relative to 100 parts by mass of cellulose ester, more preferably 0.05 to 1.0 part by mass and most preferably 0.1 to 0.5 part by mass. When the added amount is large, it becomes superior to dynamic friction coefficient and when the added amount is smaller, the aggregation becomes small.

A general disperser may be used as a disperser. A disperser is roughly categorized into a media disperser and a medialess disperser. A medialess disperser is preferable for the dispersion of silicon dioxide because low haze benefit is obtained. An example of a media disperser is a ball mill, sand mill or dyno mill.

A supersonic-type, centrifuge-type and high pressure-type are exemplified as medialess dispersers and a high pressure disperser is preferable for the invention. The high pressure disperser can generate special conditions such as high shear stress and high pressure by passing a mixed composition of fine particles and solvent in a thin tube at high speed. The maximum pressure condition when using the high pressure disperser is preferably 9.807 MPa or more in a thin tube of 1 to 2000 μm diameter, and more preferably 19.613 Mpa or more. At the same time, it is preferable that the maximum speed can reach 100 m/sec or more and thermal conductive rate is 420 kJ/h or more.

Examples of such high pressure disperser are a super high pressure homogenizer supplied from Microfluidics Corporation (trade name: Microfluidizer), nanomizer (Nanomizer Inc.) and a Manton Gaulin-type high pressure disperser such as a homogenizer supplied from Izumi Food Machinery Co., Ltd and UHN-01 supplied from Sanwa Machinery Trading Co., Ltd.

It is preferable to cast a dope containing fine particles such that the dope is in direct contact with a cast support because a film having high slipping property and low haze can be obtained.

A functional thin film such as a hard coat layer and/or anti-reflecting layer is provided after the flow-cast film is stripped, dried and wound up in a roll. The film is generally wrapped to avoid adhesion of dirt or dust caused by electrostatic charge until work or shipping.

A wrapping material is not limited as long as it can achieve the above purpose but preferably does not suppress vaporization of residual solvent in the film. Specifically, polyethylene, polyester, polypropylene, nylon, polystyrene, paper and non-woven cloth are preferable. A fiber mesh cloth is more preferably used.

(Colorant)

The present invention may use a colorant. Although a colorant generally means a dye or pigment, the colorant of the invention means that for adjusting an yellow index of a film or for reducing haze.

Various dyes and pigments may be used and an anthraquinone dye, azo dye and phthalocyanine pigment are effective.

(Peeling Agent, Anti-Static Agent)

A peeling agent or anti-static agent exists at the surface and absorbs humidity in the air, enhances electric conductivity and reduces a surface resistance. In addition, a part of it aggregates a surface of a metal belt and increases peeling property of the dope. Such a compound may be an alkyl sulfonate or alkylbenzene sulfonate. The salt may be a sodium salt, potassium salt, amine salt, ammonium salt or phosphonium salt.

Specific examples are sodium decyl sulfonate, sodium decylbenzene sulfonate, potassium decylbenzene sulfonate, sodium dodecyl sulfonate, potassium dodecyl sulfonate, sodium dodecylbenzene sulfonate, potassium dodecylbenzene sulfonate, tetrabutyl ammonium dodecylbenzene sulfonate, tetrabutyl phosphonium dodecylbenzene sulfonate, sodium tetradecyl sulfonate, sodium tetradecylbenzene sulfonate, potassium tetradecylbenzene sulfonate, sodium hexadecyl sulfonate, sodium hexadecylbenzene sulfonate, and potassium hexadecylbenzene sulfonate. Commercially available products are Hostastat HS-1 (Clariant Japan), Elecut S-412-2 and Elecut S-418 (Takemoto Oil & Fat Co., Ltd.), Neopelex G-65 (Kao Corporation) and the like.

When using the resin composition of the invention for forming the optical film of the invention using a solution casting method, the content of the compound is preferably 0.05 to 5 parts by mass relative to 100 parts of resin and particularly preferably 0.1 to 2 parts by mass. When using a molten extrusion method, the content of the compound is preferably 1 to 10 parts by mass relative to 100 parts of resin and particularly preferably 2 to 7 parts by mass. This is because when using the solution casting method, the compound tends to be unevenly distributed near the surface of the film than the molten extrusion method and thus it becomes possible to impart sufficient anti-static property even smaller amount of additives.

(Other Additives)

The cellulose ester film of the invention may be further added with a stabilizer, blocking inhibitor, fluorescent whitener, viscosity adjusting agent, antifoaming agent, clarifying agent, or pH adjusting agent. These additives may be added in batchwise to a dope containing cellulose ester before film forming or an additive-containing solution predetermined prepared may be added in-line.

(Fabrication Method of Phase Difference Film)

Next, a method of the phase difference film of the invention will be described.

A film formed by the solution casting method or by the molten casting method may be used as the phase difference film of the invention.

The phase difference film of the invention is fabricated, when using the solution casting method, as following steps, which are a step of preparing a dope by dissolving cellulose ester and additives in a solvent, a step of casting the dope on an endless metal support like a caterpillar, a step of drying the cast dope as a web, a step of peeling off the web from the metal support, a step of stretching or maintaining the width, a step of further drying the web, and a step of winding up the film.

(Dope Preparation)

The dope preparation process will be described. When the cellulose ester concentration in the dope is high, the drying step after casting on the metal support becomes easier and thus it is preferable. On the other hand, when the concentration of cellulose ester is too high, filtration load becomes large and filtration accuracy becomes poor. Therefore, the compatible concentration is preferably 10 to 35% by mass and more preferably 12 to 25% by mass. A solvent used for the dope of the invention may be one or two or more used in combination. It is preferable to use a mixture of a good solvent and a poor solvent for a cellulose ester from the viewpoint of productivity, and it is preferable to use more amount of good solvent than poor solvent because it imparts good solubility to cellulose ester. A mixing ratio of a good solvent and a poor solvent is 70 to 98% by mass of good solvent and 2 to 30% by mass of poor solvent. The good solvent is defined in this description that cellulose ester is dissolved when used alone and the poor solvent is defined that cellulose ester is swelled or undissolved when used alone. Therefore, a good solvent or poor solvent depends on a degree of acetyl group substitution in a cellulose ester. For example, an acetone becomes a good solvent for a cellulose acetate having a degree of acetyl group substitution of 2.4 and becomes a poor solvent for a cellulose acetate having a degree of acetyl group substitution of 2.8.

A good solvent for the invention is not limited and examples are organic halogen compounds such as a methylene chloride, and dioxolanes, acetone, methyl acetate and methyl acetoacetate. A methylene chloride and methyl acetate are particularly preferable.

A poor solvent for the invention is not limited and preferable examples are methanol, ethanol, n-butanol, cyclohexane and cyclohexanone. Preferably water is contained in the dope by 0.01 to 2% by mass.

When preparing the dope, any general method for dissolving cellulose ester may be employed. Heating under pressure enables the solvent to heat up above the boiling point at a normal pressure. Stirring for dissolution at a temperature above the boiling point at a normal pressure of the solvent but within the range not allowing the solvent to boil under pressure is preferable in view of preventing formation of massive insoluble matter called gel or lump. Also a method of moistening or swelling the cellulose ester by mixing it with a poor solvent and then dissolving it by adding a good solvent is preferably used.

The pressurizing is performed by pressure-feeding an inert gas such as nitrogen gas or allowing the solvent to increase vapor pressure by heating. A heating from outside is preferable and a jacket-type heating system, for example, is preferable by virtue of its readiness in temperature control.

The heating temperature in the presence of the solvent is preferably high from the viewpoint of solubility of the cellulose ester, whereas an excessively high heating temperature may require higher pressure to thereby cause poor productivity. The heating temperature is preferably 45 to 120° C., more preferably 60 to 110° C. and further preferably 70° C. to 105° C. The pressure is adjusted so as not allow the solvent to boil at a set temperature.

Alternatively, also a cooling solubilization method is preferably used, by which the cellulose ester can be dissolved into a solvent such as methyl acetate.

Next, the cellulose ester solution is filtered through an appropriate filter medium such as a filter paper. A filter medium having a small absolute filter rating is preferable in view of removing insoluble matters, whereas the filter medium may suffer from clogging if the absolute filter rating is excessively small. Accordingly, the filter medium preferably has an absolute filter rating of 0.008 mm or smaller, more preferably 0.001 to 0.008 mm and further preferably 0.003 to 0.006 mm.

The filter medium used herein is selectable from general filter media without special limitation. Preferable examples are plastic media such as polypropylene and Teflon (registered trademark), and metal media such as stainless steel which are free from peeling-off of fiber. The cellulose ester solution is preferably filtered so as to remove or reduce impurities contained in the cellulose ester, in particular foreign matter causative of bright dot.

The foreign matter causative of bright dot is a dot (foreign matter) seen as leakage of light when a cellulose ester film is placed between two polarizing plates arranged in the crossed nicols configuration and the stack is illuminated from the side of one polarizing plate and observed from the side of the other polarizing plate. The number of bright dots of 0.01 mm or larger in diameter is preferably 200/cm$^2$ or below, more preferably 100/cm$^2$ or below, further preferably 50/m$^2$ or below, and particularly 0 to 10/cm$^2$. Also population of dots of 0.01 mm or smaller in diameter is preferably small.

The dope may be filtered by any method. In view of suppressing difference in filtration pressure (pressure difference) before and after the filtration, it is preferable to proceed the filtration under heating in the temperature range not lower than the boiling point of the solvent at a normal pressure and not allowing the solvent to boil under pressure. The temperature range is preferably 45 to 120° C., more preferably 45 to 70° C. and further preferably 45 to 55° C.

A smaller filtration pressure is better. The filtering pressure is preferably 1.6 MPa or smaller, more preferably 1.2 MPa or smaller and further preferably 1.0 MPa or smaller.

(Dope Casting Step)

The dope is preferably casted on a drum or metal support having a surface temperature of 10° C. or lower. It is preferable to dry the cast dope after casting by air-blow at least two seconds. It is possible, after peeling off the film from the drum or metal support, to dry the film by air blowing at a temperature of 100° C. to 160° C. by changing the temperature to evaporate residual solvent. This method is described in Patent Document JPH5-17844A. The method can make reduce the time from casting to peeling. It is necessary that the dope becomes a gel at the surface temperature of the drum or metal support to employ the method.

The metal support used in the casting process is preferably mirror-finished on the surface thereof. The metal support preferably used is a stainless steel belt or a die-cast drum with a plated surface. Width of casting is selectable from 1 to 4 m. The temperature of the surface of the metal support in the casting process is adjusted in the range from −50° C. to a temperature lower than the boiling point of the solvent. The temperature is preferably high in view of accelerating the drying speed of the web, whereas the web may foam or the planarity of the web may be degraded if the temperature is excessively high. The temperature of the support is preferably 0 to 100° C., and more preferably 5 to 30° C. Another preferable method is such as cooling the web to gelate, and then the web is separated from the drum with a lot of residual solvent retained therein. Methods of controlling the temperature of the metal support is not specifically limited and possible methods include a method of blowing a hot air or cool air and a method of bringing warm water into contact with the back surface of the metal support. The method of using warm water is more preferable since heat conduction is more effective so that the temperature of the metal support may be stabilized within a short time. When the hot air is used, the temperature of the air may occasionally be higher than a target temperature while preventing foaming. Particularly it is preferable to change the temperatures of the support and the drying blow to dry the web efficiently.

In order to ensuring a desirable planarity of the cellulose ester film, the amount of residual solvent of the web, when peeled from the metal support, is preferably 10 to 150% by mass, more preferably 20 to 40% by mass or 60 to 130% by mass, and particularly 20 to 30% by mass or 70 to 120% by mass. The temperature at the peeling position on the metal support is −50° C. to 40° C., more preferably 10° C. to 40° C. and most preferably 15° C. to 30° C.

In the present invention, the amount of residual solvent is given by the equation below.

Amount of residual solvent (% by mass)=$\{(M-N)/N\} \times 100$ where, M represents mass of a sample collected at an arbitrary point of time in or after the process of producing the web or film and N represents mass of the sample after heated at 115° C. for 1 hour.

In the process of drying the cellulose ester film, the web peeled from the metal support is further dried to reduce the content of residual solvent down to 0.5% by mass or below.

In the film drying process, generally used is a roller drying method (by which the web is dried while allowing it to alternately travel over a number of rollers disposed upside and downside) or a method of drying the web transferred using a tenter.

When the web is peeled off from the metal support, the web may be longitudinally elongated by the peeling tension and subsequent transferring tension. Consequently, when peeling off the web from the cast support, it is preferable to reduce the peeling tension and transferring tension as low as possible. Specifically, it is effective that the tension is 50 to 170 N/m or smaller. It is preferable to fix the web rapidly by blowing cool air of 20° C. or lower at that time.

The refractive index (an in-plane refractive index in the direction of slow axis is nx, an in-plane refractive index in the direction normal to the slow axis is ny, and a refractive index in the thickness direction is nz) of the cellulose ester film may be adjusted by stretching process.

(Stretching Process)

Method of stretching the web is not specifically limited. Examples of the method include a method of longitudinally stretching the web over a plurality of rollers having different peripheral speeds; a method of longitudinally stretching the web by holding both edges thereof with clips or pins and broadening distance between the clips or pins in the forward direction; a similar method of transversely stretching the web by broadening the distance in the transverse direction; and a method of longitudinally and transversely stretching the web by broadening the distance at the same time in the longitudinal and transverse directions. Of course, these methods may be used in combination. Specifically, the web may be stretched in the transverse direction, longitudinal direction or in both directions relative to the film-forming direction. When stretching in both directions, simultaneous stretching or serial stretching may be possible. In the so-called tenter process, the clips are preferably driven by a linear drive system since the stretching may be smoothened and a risk of rupture or the like may be reduced.

In the present invention, it is preferable to stretch the web in the transferring direction utilizing the difference between peripheral speeds of the film transferring rollers or in the orthogonal direction (referred to as a widthwise direction or TD direction) of the transferring direction by the tenter system that holds both ends of the web by clips and the like. Particularly, the tenter which web holding-lengths (distance from holding to unholding) of the right holding means and the left holding means can be controlled independently is preferable.

It is preferable that the phase difference film has a configuration of the present invention and the refractive index is controlled by controlling a transfer tension and stretching operation to obtain target retardation values Ro and Rt.

For example, it becomes possible to change a retardation value by reducing or increasing a longitudinal tension.

For example, the web may be stretched in the longitudinal direction of the film (direction of film forming) and in the direction orthogonal thereto in plane, or in the widthwise direction, biaxially or uniaxially, in a sequential or simultaneous manner.

Factors of stretching in two directions orthogonal to each other are preferably adjusted finally to 0.8 to 1.5 in the direction of casting and 1.1 to 2.5 in the widthwise direction, and more preferably to 0.8 to 1.0 in the direction of casting and 1.2 to 2.0 in the widthwise direction.

Stretching temperature is preferably 120° C. to 200° C., more preferably 150° C. to 200° C. and further preferably over 150° C. and 190° C. or lower.

Content of residual solvent in the film under stretching is preferably 20 to 0% and more preferably 15 to 0%.

Specifically, a web is preferably stretched at 11% of the residual solvent at 155° C. or at 2% of the residual solvent at 155° C. Or a web is preferably stretched at 11% of the residual solvent at 160° C. or at 1% or less of the residual solvent at 160° C.

The phase difference film of the invention preferably has an in-plane retardation Ro of 30 to 160 nm defined by a following equation (4) and a retardation Rt in a thickness direction of 70 to 400 nm defined by a following equation (5), when a film thickness is 30 μm, because it can enlarge a viewing angle of a liquid crystal display device of VA (MVA and PVA) type which is described later.

$$Ro=(nx-ny)*d \text{ (* means multiply)} \quad \text{Equation (4):}$$

$$Rt=\{(nx+ny)/2-nz\}*d \quad \text{Equation (5):}$$

where, nx represents refractive index in the slow axis direction in a film plane, ny represents refractive index in the first axis direction in a film plane, nz represents refractive index in the thickness-wise direction of the film, and d (nm) represents a thickness of the film. These retardation values Ro and Rt can be measured using KOBRA-21ADH (from Oji Scientific Instruments) at 23° C. and under 55% of RH by the measurement wavelength of 590 nm.

Assuming that the slow axis or the fast axis of the phase difference film of the present invention exists in the film plane and that the angle between the axis and the film formation direction is represented by θ1, the angle θ1 is preferably −1° or larger and +1° or smaller, and more preferably −0.5° or larger and +0.5° or smaller.

The angle θ1 may be defined as alignment angle and can be measured using an automatic birefringence analyzer KOBRA-21ADH (from Oji Scientific Instruments). The angle θ1 adjusted to fall in the above-described ranges will contribute to high luminance of displayed images and suppression or prevention of leakage light, and will consequently contribute to faithful color reproduction in a color liquid crystal display device.

(Drying)

A drying means of the web after casting or stretching is not limited and a hot blowing, infrared radiation, heating roller or microwave may be used in general, and the hot blowing is preferable because of easiness. The drying temperature at the web drying process is preferably the glass transition temperature of the film minus 5 or smaller degrees C. and plus 100 or larger degrees C. and the drying time will be effective in 10 minutes or longer and 60 minutes or shorter. The drying temperature is 100° C. to 200° C. and more preferably 110° C. to 160° C. After predetermined heating processing, it is preferable to cut edge portions by a slitter before winding to obtain a better roll shape. In addition, it is preferable to make knurling at both widthwise ends. The knurling can be formed by pressing a heated embossed roller. The embossed roller has small bumps and dips on a surface and bumps and dips can be formed on the film by pressing the roller so as to make both ends bulky.

The knurling height at both widthwise ends of the phase difference film of the invention is preferably 4 to 20 μm and the width is preferably 5 to 20 mm. The knurling is preferably formed after drying and before winding in the film forming process.

(Characteristics of Phase Difference Film)

The water transmission rate of the phase difference film of the invention is preferably 300 to 1800 g/m²·0.24 h at 40° C. and 90% RH, more preferably 400 to 1500 g/m²·0.24 h and particularly preferably 400 to 1300 g/m²·0.24 h. The water transmission rate can be measured in conformance with JIS Z-0208. The elongation at break of the phase difference film of the invention is preferably 10 to 80% and more preferably 20 to 50%.

The visible light transmittance of the phase difference film of the invention is preferably 90% or more and more preferably 93% or more.

The phase difference film of the invention preferably has an equilibrium water content of 4% or less at 25° C. and 60% relative humidity, and more preferably 3% or less. By making the mean water content 4% or less, the film preferably becomes easy to respond temperature change and its optical characteristics and the size become less prone to change.

The haze of the phase difference film of the invention is preferably 1% or less. The haze can be measured by a haze meter NDH2000 (Nippon Denshoku Industries Co., Ltd) at 23° C. and 55% relative humidity in conformance with JIS K7136. The haze is more preferably 0.5% or less.

(Film Thickness)

The mean film thickness of the phase difference film of the invention is preferably 10 to 80 μm and more preferably 10 to 30 μm. It is more preferable to make the thickness 20 μm or more because it becomes easy to handle the film in forming the web.

(Length and Width of Film)

The phase difference film of the invention is preferably a long size, specifically 100 to 10000 m, and wound up in a roll. A width of the phase difference film of the invention is preferably 1 m or more, more preferably 1.4 m or more and particularly preferably 1.4 to 4 m.

(Manufacturing Method of Polarizing Plate)

The phase difference film of the invention may be used for a polarizing plate and a liquid crystal display device using the polarizing plate.

The polarizing plate of the invention is manufactured by adhering the phase difference film of the invention at least one side of a polarizer. The liquid crystal display device of the invention is configured such that the polarizing plate of the invention is adhered to at least one side of a liquid crystal cell using a sticky layer or the like.

The polarizing plate may be manufactured by general methods. It is preferable to saponify the surface, on the polarizer side, of the phase difference film of the present invention with an alkali, and then to bond it onto at least one side of the polarizer (manufactured by dipping into an iodine solution and by stretching) using an aqueous solution of fully-saponified polyvinyl alcohol.

Another phase difference film may be bonded on the other side of the polarizer, or other film may be preferably bonded.

A commercially available cellulose ester film such as KonicaMinolta Tac KC8UX, KC5UX, KC8UCR3, KC8UCR4, KC8UCR5, KC8UY, KC4UY, KC4UE, KC8UE, KC8UY-HA, KC8UX-RHA, KC8UXW-RHA-C, KC8UXW-RHA-NC, or KC4UXW-RHA-NC (all from Konica Minolta Advanced Layer Co., Ltd.) is also preferable.

A polarizing plate used at the front side of a display device preferably includes an antireflecting layer, antistatic layer, antifouling layer, and backcoat layer as well as an antiglare layer or clear hard coat layer. A polarizer as a main component of the polarizing plate is an element that transmits light having a predetermined polarizing plane only. A known representative polarizer is a polyvinyl alcohol-based polarizing film and there are two types of films, which are those a polyvinyl alcohol film is dyed with iodine and those dyed with a dichroic dye. A polarizer generally used is obtained by making a polyvinyl alcohol film from an aqueous solution and uniaxially stretching the film followed by dying, or by dying the film followed by uniaxial stretching and then preferably by toughening the film using a boron compound. A thickness of the polarizer is preferably 5 to 30 μm and particularly preferably 10 to 20 μm.

An ethylene-modified polyvinyl alcohol that contains ethylene unit of 1 to 4 mol % and has a polymerization degree of 2000 to 4000 and saponification degree of 99.0 to 99.99 mol %, which is described in JP2003-248123A and JP2003-342322A, is also preferably used.

Among them, an ethylene-modified polyvinyl alcohol film whose hot water cutting temperature is 66 to 73° C. is preferably used.

The polarizer using the ethylene-modified polyvinyl alcohol film is superior to polarization property and endurance as well as less color inconsistency, and therefore it is preferably used for large-type liquid crystal display device.

The polarizer thus obtained is generally bonded with a protective film on one side or both sides thereof. An adhesive for bonding the film is a PVA-based adhesive or urethane-based adhesive, and a PVA-based adhesive is preferable. Other adhesives used for the invention are UV curable adhesive such as a (meth)acrylate-based adhesive or ene/tiol-based adhesive, an adhesive using a photo radical polymerization reaction such as an unsaturated polyester-based adhesive, or an adhesive using a photo cation polymerization reaction such as a epoxy-based adhesive, oxetane-based adhesive, epoxy/oxetane-based adhesive or vinylether-based adhesive. Among them, an adhesive using a photo cation polymerization reaction is preferable and an epoxy-based adhesive is more preferable as a UV-curable adhesive. Specifically, a polarizing plate can be preferably produced by using an epoxy-based adhesive described in JP2011-28234A and JP2010-209126A. The protective film may be treated for adhesion-easiness such as saponification treatment, corona discharge treatment, primer treatment or anchor coating treatment on a bonding surface before bonding to the polarizer.

(Liquid Crystal Display Device)

The liquid crystal display device of the invention having various excellent visibility can be manufactured using the polarizing plate of the invention.

The phase difference film of the invention can be applied to liquid crystal display devices of various driving types such as STN, TN, OCB, HAN, VA (MVA, PVA), IPS and OCB.

The device is preferably a VA (MVA, PVA) type liquid crystal display device.

Particularly a liquid crystal display device having excellent visibility such as a front contrast even it is a large-type display device.

EXAMPLES

The present invention will be explained as an example below without intension to limit the invention thereto.

Example 1

Synthesis of Cellulose Ester

Cellulose esters having different acyl groups, degrees of substitution and molecular weights were synthesized as shown in Table 1. Specifically, a carboxylic acid as a raw material of the acyl-substituted group and sulfuric acid as a catalyst (7.8 parts by mass relative to 100 parts by mass of cellulose) were added to allow an acylation reaction at 40° C. The cellulose esters having different acyl groups, degrees of substitution and molecular weights shown in Table 1 were synthesized by the synthesizing method disclosed in JP2009-19123A such that a kind and mass of the carboxylic acid and an amount of the catalyst were adjusted so as to control a reaction rate of acylation and adjust the substitution degree. After acylation, the product was aged at 40° C.

A mean polymerization degree of the sample was adjusted by removing a low molecular weight component of the cellulose ester by washing with acetone.

The degree of acetyl group substitution was determined by the method of Tezuka (Tezuka, Carbohydr. Res., 273, 83 (1995)). Specifically, the sample (cellulose ester) was dissolved in heavy chloroform and $^{13}$C-NMR spectrum was measured. For example, signals of carbonyl carbons of the acetyl group appear in the order of second, third and sixth position from the high magnetic field side in a range from 169 ppm to 171 ppm and signals of carbonyl carbons of the propionyl group appear in the same order in a range from 172 ppm to 174 ppm.

The distribution of acyl groups such as an acetyl group was measured by an abundance of acetyl group, propionyl group, and the like at corresponding positions.

TABLE 1

| CELLULOSE ESTER | ACETATE GROUP | PROPIONATE GROUP | BUTYLATE GROUP | $DS_2 + DS_3 + DS_6$ | $DS_6$ | WEIGHT AVERAGE MOLECULAR WEIGHT [Mw] |
|---|---|---|---|---|---|---|
| A1 | 0.88 | — | — | 0.88 | 0.65 | 150000 |
| A2 | 1.22 | — | — | 1.22 | 0.65 | 150000 |
| A3 | 1.55 | — | — | 1.55 | 0.65 | 150000 |

TABLE 1-continued

| CELLULOSE ESTER | ACETATE GROUP | PROPIONATE GROUP | BUTYLATE GROUP | $DS_2 + DS_3 + DS_6$ | $DS_6$ | WEIGHT AVERAGE MOLECULAR WEIGHT [Mw] |
|---|---|---|---|---|---|---|
| A4 | 1.87 | — | — | 1.87 | 0.65 | 150000 |
| A5 | 2.11 | — | — | 2.11 | 0.65 | 150000 |
| A6 | 1.55 | — | — | 1.55 | 0.41 | 150000 |
| A7 | 1.55 | — | — | 1.55 | 0.89 | 150000 |
| A8 | 1.88 | — | — | 1.88 | 1.00 | 150000 |
| A9 | 1.55 | — | — | 1.55 | 0.65 | 25000 |
| A10 | 1.55 | — | — | 1.55 | 0.65 | 80000 |
| A11 | 1.55 | — | — | 1.55 | 0.65 | 250000 |
| A12 | 1.55 | — | — | 1.55 | 0.65 | 450000 |
| A13 | 0.88 | 0.10 | — | 0.98 | 0.66 | 135000 |
| A14 | 1.35 | 0.11 | — | 1.46 | 0.66 | 135000 |
| A15 | 1.35 | 0.55 | — | 1.90 | 0.66 | 135000 |
| A16 | 1.35 | 0.88 | — | 2.23 | 0.66 | 135000 |
| A17 | 0.10 | 0.88 | — | 0.98 | 0.66 | 190000 |
| A18 | 0.11 | 1.35 | — | 1.46 | 0.66 | 190000 |
| A19 | 0.55 | 1.35 | — | 1.90 | 0.66 | 190000 |
| A20 | 0.88 | 1.35 | — | 2.23 | 0.66 | 190000 |
| A21 | 0.23 | — | 1.39 | 1.62 | 0.61 | 120000 |
| A22 | 0.55 | 0.10 | 0.89 | 1.54 | 0.92 | 120000 |
| A23 | 0.11 | 1.35 | — | 1.46 | 0.66 | 25000 |
| A24 | 0.11 | 1.35 | — | 1.46 | 0.66 | 80000 |
| A25 | 0.11 | 1.35 | — | 1.46 | 0.66 | 250000 |
| A26 | 0.11 | 1.35 | — | 1.46 | 0.66 | 450000 |
| A27 | 0.11 | 1.35 | — | 1.46 | 0.41 | 190000 |
| A28 | 0.11 | 1.35 | — | 1.46 | 0.89 | 190000 |
| A29 | 0.11 | 1.35 | — | 1.46 | 1.00 | 190000 |

(Synthesis of Vinyl Polymers and Oligomers B1 to B23)

A mixture (40 g) of monomers Xa, Xb and Xc of kinds and content ratios shown in Table 2, mercaptopropionic acid (2 g) as a chain transfer agent and toluene (30 g) were put in a glass flask equipped with a stirrer, two dropping funnels, gas inlet and thermometer and heated to 90° C.

After that, 60 g of a mixture of monomers Xa, Xb and Xc of kinds and content ratios shown in Table 2 was dropped from one dropping funnel in three hours and 0.4 g of azobisisobutyronitrile dissolved in 14 g of toluene was dropped from the other dropping funnel in three hours.

Further 0.6 g of azobisisobutyronitrile dissolved in 56 g of toluene was dropped in two hours, and then the reaction was continued in two hours to obtain polymer X.

The polymer X was a solid in normal temperature. Other polymers X having different molecular weights were prepared by changing an amount of added mercaptopropionic acid as a chain transfer agent and an adding rate of the azobisisobutyronitrile.

The composition of monomers and the like of the vinyl polymers and the oligomers B1 to B23 of the invention were summarized in Table 2.

C1 and C2 are Elecut S-412-2 (Takemoto Oil ans Fat Co., Ltd.) and Neopelex G-65 (Kao Corporation), respectively and C3 to C10 are saccharide-carboxylic acid ester compounds A-5 and A-6 and phase difference adjusting agents B-1 to B-6, respectively.

Abbreviations of monomers in Table 2 are as follows. MMA: methyl methacrylate, HEMA: 2-hydroxyethyl methacrylate, ACMO: acryloyl morpholine, VP: N-vinyl pyrrolidone, HEA: 2-hydroxyethyl acrylate, AA: acrylic acid, St: styrene, MAA: methacrylic acid, MA: maleic anhydride.

TABLE 2

| | VINYL-POLYMER OR OLIGOMER(X) | | | | | | WEIGHT AVERAGE MOLECULAR WEIGHT [Mw] |
|---|---|---|---|---|---|---|---|
| | Xa | | Xb | | Xc | | |
| | TYPE OF MONOMER | CONTENT RATIO [%] | TYPE OF MONOMER | CONTENT RATIO [%] | TYPE OF MONOMER | CONTENT RATIO [%] | |
| B1 | MMA | 100 | — | — | — | — | 100 |
| B2 | MMA | 100 | — | — | — | — | 1000 |
| B3 | MMA | 100 | — | — | — | — | 10000 |
| B4 | MMA | 100 | — | — | — | — | 150000 |
| B5 | MMA | 100 | — | — | — | — | 250000 |
| B6 | MMA | 70 | HEMA | 30 | — | — | 10000 |
| B7 | MMA | 70 | VP | 30 | — | — | 10000 |
| B8 | MMA | 70 | HEA | 30 | — | — | 10000 |
| B9 | MMA | 70 | AA | 30 | — | — | 10000 |
| B10 | MMA | 70 | St | 30 | — | — | 10000 |
| B11 | MMA | 70 | MAA | 30 | — | — | 10000 |
| B12 | MMA | 70 | MA | 30 | — | — | 10000 |
| B13 | MMA | 70 | ACMO | 30 | VP | — | 10000 |
| B14 | MMA | 70 | ACMO | 30 | HEMA | — | 10000 |

TABLE 2-continued

| | VINYL-POLYMER OR OLIGOMER(X) | | | | | | WEIGHT AVERAGE MOLECULAR WEIGHT [Mw] |
|---|---|---|---|---|---|---|---|
| | Xa | | Xb | | Xc | | |
| | TYPE OF MONOMER | CONTENT RATIO [%] | TYPE OF MONOMER | CONTENT RATIO [%] | TYPE OF MONOMER | CONTENT RATIO [%] | |
| B15 | MMA | 70 | HEMA | 30 | VP | — | 10000 |
| B16 | MMA | 40 | ACMO | 60 | — | — | 10000 |
| B17 | MMA | 50 | ACMO | 50 | — | — | 10000 |
| B18 | MMA | 60 | ACMO | 40 | — | — | 10000 |
| B19 | MMA | 70 | ACMO | 30 | — | — | 10000 |
| B20 | MMA | 80 | ACMO | 20 | — | — | 10000 |
| B21 | MMA | 90 | ACMO | 10 | — | — | 10000 |
| B22 | MMA | 70 | ACMO | 30 | — | — | 1000 |
| B23 | MMA | 70 | ACMO | 30 | — | — | 100000 |

MMA: METHYL METHACRYLATE
HEMA: HYDROXYETHYL METHYLMETHACRYLATE
ACMO: ACRYLOYL MORPHOLINE
VP: VINYL PYRROLIDONE
HEA: HYDROXYETHYL METHYLACRYLATE
AA: ACRYLIC ACID
St: STYRENE
MAA: METHACRYLIC ACID
MA: MALEIC ANHYDRIDE (Preparation of Film of Sample 30)
(Fine Particles Dispersion Solution)

| Fine particles (Aerosil R812, Japan Aerosil K.K.) | 11 parts by mass |
|---|---|
| Ethanol | 89 parts by mass |

Both of the above were mixed and stirred in a dissolver in 50 minutes and then dispersed using a manton gaulin homogenizer.

Methylene chloride was put in a dissolving tank and the fine particles dispersion solution was added slowly while stirring sufficiently. The solution was further dispersed using an attritor so that a secondary particle size became a predetermined size. The solution was filtered using the Fine Met NF (Nippon Seisen Co., Ltd.) to obtain a fine particles additive solution.

| Methylene chloride | 99 parts by mass |
|---|---|
| Fine particles dispersion solution | 5 parts by mass |

A main dope of the composition below was prepared. Methylene chloride and ethanol were put in a pressurized dissolving tank. In the pressurized dissolving tank containing the solvent, a cellulose ester designated as A2 in Table 1 was added while stirring the solvent. The solution was heated and stirred to dissolve the cellulose ester perfectly and filtered using Azumi filter No. 244 (Azumi Filter Paper Co., Ltd.) to prepare the main dope.

(Composition of Main Dope)

The dope having the following composition was prepared and prepared the film of the sample 30.

(Preparation of Dope of Sample 30)

| Cellulose acetate (A2 in Table 1) | 60 parts by mass |
|---|---|
| Vinyl-based polymer and oligomer (B2 in Table 2) | 40 parts by mass |
| Fine particles additive solution | 2 parts by mass |

-continued

| Dichloromethane | 406 parts by mass |
|---|---|
| Methanol | 61 parts by mass |

The above components were put into a mixing tank and stirred to dissolve them and the solution was filtered using a filter paper of mean pore size of 34 μm and a sintered metal filter of mean pore size of 10 μm to obtain each cellulose ester dope. The dope was cast using a caster. After casting, the film was peeled off from a band at the condition that residual solvent was approximately 30% by mass. The film was blown with hot air of 160° C. and stretched widthwise using a tenter by a stretching ratio of 32%, and then relaxed at 140° C. for 60 seconds so that the stretching magnification became 30%. After that, the film was transferred by roller conveying instead of the tenter conveying and dried at 120 to 150° C. so as to wind up. A thickness of the film was 30 μm.

(Preparation of Film Samples 1 to 29 and 31 to 116)

Film samples 1 to 29 and 31 to 116 were prepared by the same method as that of the sample 30 except that the kinds of the cellulose ester and the compound and amounts of addition were changed as shown in Table 3.

Example 2

Preparation of Polarizing Plate

A polyvinyl alcohol film of 120 μm thickness was uniaxially stretched (temperature 110° C., stretching magnification of 5).

The stretched film was immersed in an aqueous solution composed of 0.075 g of iodine, 5 g of potassium iodide and 100 g of water for 60 seconds, and then immersed in an aqueous solution composed of 6 g of potassium iodide, 7.5 g of boric acid and 100 g of water at 68° C. The film was then washed with water and dried to obtain a polarizer.

Each of the polarizing plates 1 to 116 was manufactured by bonding the polarizer with each of the phase difference films 1 to 116 prepared in Example 1 and Konica Minolta Tac KC4UY (cellulose ester film by Konica Minolta Advanced Layer Co., Ltd.) at the backside according to following steps 1 to 5.

Step 1: Each of the phase difference films 1 to 116 and the Konica Minolta Tac KC4UY was immersed in a sodium hydroxide solution of 2 mol/L at 60° C. for 90 seconds to saponify the side which would be bonded with the polarizer and then water-washed and dried.

Step 2: The polarizer was immersed in a tank containing polyvinyl alcohol adhesive of 2% by mass of solid content for 1 to 2 seconds.

Step 3: The polarizer was gently wiped so as to remove an excessive portion of the adhesive adhered thereon in Step 2, and then placed on the phase difference films 1 to 116 processed in Step 1.

Step 4: Each of the phase difference films 1 to 116 and polarizer laminated at the step 3 and Konica Minolta Tac KC4UY at the backside were bonded under a pressure of 20 to 30 N/cm$^2$ and a conveying speed of approximately 2 m/min.

Step 5: The laminated samples of the polarizer, phase difference films 1 to 116 and Konica Minolta Tac KC4UY manufactured in the step 4 were dried in a dryer at 80° C. for 2 minutes to obtain the polarizing plates 1 to 116 corresponding to the phase difference films 1 to 116.

(Fabrication of Liquid Crystal Display Device)

A liquid crystal panel for testing a viewing angle was fabricated as follows and characteristics as a liquid crystal display device were evaluated.

Polarizing plates bonded on both sides of the 40-inch display device BRAVIA X1 (Sony Corporation) were removed and the above manufactured polarizing plates 1 to 116, respectively, were bonded on the both sides of the glass of the liquid crystal cell.

The liquid crystal display devices 1 to 116 corresponding to the polarizing plates 1 to 116 were fabricated such that the direction of the bonded polarizing plate was such that the surface of each of the phase difference films 1 to 116 faced to the liquid crystal cell side and the absorption axis headed to the same direction to which the originally bonded polarizing plate headed.

(Evaluation)

(Evaluation of Retardation)

The refractive indexes nx, ny and nz were determined by measuring three dimensional refractive indexes at 10 points at a wavelength of 590 nm under the circumstances of 23° C. and 55% RH using an automatic birefringence analyzer (KO-BRA-21ADH, Oji Scientific Instruments). The retardations Ro and Rt at the 10 points were calculated based on the following equations (4) and (5) and the mean values were shown.

$$Ro=(nx-ny)*d \qquad \text{Equation (4):}$$

$$Rt=\{(nx+ny)/2-nz\}*d \qquad \text{Equation (5):}$$

Where nx is the largest refractive index in the film plane, ny is a refractive index in the in-plane axis direction orthogonal to the nx, nz is a refractive index in the thickness direction and d (nm) is a thickness of the film. As a result, the phase difference film of the invention preferably has an Ro of 30 to 160 nm and an Rt of 70 to 400 nm when the thickness is 30 μm.

(Measurement of Photoelastic Coefficient)

The in-plane film retardation (Ro) was measured while holding both ends in the widthwise direction of the phase difference film sample and loading, and the value was divided by the film thickness (d) to obtain Δn (=Ro/d). The Δn at various loads were obtained to draw a load-Δn curve and the inclination of the curve was determined as a photoelastic coefficient. The in-plane film retardation (Ro) was measured at a wavelength of 590 nm under the circumstances of 25° C. and 55% RH using a retardation analyzer (KOBURA 31PR, Oji Scientific Instruments). The photoelastic coefficient is preferably $20\times10^{-13}$ cm$^2$/dyn or smaller to suppress display unevenness such as corner unevenness, LED unevenness or warping unevenness when fabricated into a liquid crystal display device.

(Haze Measurement)

The haze of each film sample was measured by a method in conformity with JIS K7136 using the NDH2000 (Nippon Denshoku Industries Co., Ltd).

(Transmittance Measurement of Single Polarizing Plate)

The above-manufactured polarizing plate was cut out into a sample plate of 2×5 cm and the transmittance was measured using Shimadzu self-registering spectrophotometer UV3100. The transmittance in the range from 400 to 700 nm of a single polarizing plate was obtained with visibility correction. The transmittance of a single polarizing plate is preferably 42% or larger to suppress decreasing of contrast.

(Evaluation of Viewing Angle)

The front contrast ratio (white transmittance/black transmittance) of each liquid crystal display device was measured using a measuring equipment (EZ-Contrast 160D, ELDIM).

The evaluation results are shown in Tables 3 to 6.

TABLE 3

| SAMPLE | | COMPONENT | | | | | | | |
|---|---|---|---|---|---|---|---|---|---|
| | | CELLULOSE ESTER | | VINYL-POLYMER OR OLIGOMER | | ADDITIVE 1 | | ADDITIVE 2 | |
| No. | SPEC | TYPE | PART BY MASS | TYPE | PART BY MASS | TYPE | PART BY MASS | TYPE | PART BY MASS |
| 1 | COMPARATIVE EXAMPLE | A1 | 100 | — | — | — | — | — | — |
| 2 | PRESENT INVENTION | A2 | 100 | — | — | — | — | — | — |
| 3 | PRESENT INVENTION | A3 | 100 | — | — | — | — | — | — |
| 4 | PRESENT INVENTION | A4 | 100 | — | — | — | — | — | — |
| 5 | COMPARATIVE EXAMPLE | A5 | 100 | — | — | — | — | — | — |
| 6 | COMPARATIVE EXAMPLE | A6 | 100 | — | — | — | — | — | — |
| 7 | PRESENT INVENTION | A7 | 100 | — | — | — | — | — | — |
| 8 | PRESENT INVENTION | A8 | 100 | — | — | — | — | — | — |
| 9 | PRESENT INVENTION | A9 | 100 | — | — | — | — | — | — |
| 10 | PRESENT INVENTION | A10 | 100 | — | — | — | — | — | — |
| 11 | PRESENT INVENTION | A11 | 100 | — | — | — | — | — | — |
| 12 | PRESENT INVENTION | A12 | 100 | — | — | — | — | — | — |
| 13 | COMPARATIVE EXAMPLE | A13 | 100 | — | — | — | — | — | — |

TABLE 3-continued

| No. | SPEC | SAMPLE | | | | | | | |
|---|---|---|---|---|---|---|---|---|---|
| 14 | PRESENT INVENTION | A14 | 100 | — | — | — | — | — | — |
| 15 | PRESENT INVENTION | A15 | 100 | — | — | — | — | — | — |
| 16 | COMPARATIVE EXAMPLE | A16 | 100 | — | — | — | — | — | — |
| 17 | COMPARATIVE EXAMPLE | A17 | 100 | — | — | — | — | — | — |
| 18 | PRESENT INVENTION | A18 | 100 | — | — | — | — | — | — |
| 19 | PRESENT INVENTION | A19 | 100 | — | — | — | — | — | — |
| 20 | COMPARATIVE EXAMPLE | A20 | 100 | — | — | — | — | — | — |
| 21 | PRESENT INVENTION | A21 | 100 | — | — | — | — | — | — |
| 22 | PRESENT INVENTION | A22 | 100 | — | — | — | — | — | — |
| 23 | PRESENT INVENTION | A23 | 100 | — | — | — | — | — | — |
| 24 | PRESENT INVENTION | A24 | 100 | — | — | — | — | — | — |
| 25 | PRESENT INVENTION | A25 | 100 | — | — | — | — | — | — |
| 26 | PRESENT INVENTION | A26 | 100 | — | — | — | — | — | — |
| 27 | COMPARATIVE EXAMPLE | A27 | 100 | — | — | — | — | — | — |
| 28 | PRESENT INVENTION | A28 | 100 | — | — | — | — | — | — |
| 29 | PRESENT INVENTION | A29 | 100 | — | — | — | — | — | — |

| SAMPLE | | OPTICAL CHARACTERISTICS | | | | | |
|---|---|---|---|---|---|---|---|
| | | Re [nm] | | PHOTOELASTIC COEFFICIENT | HAZE | POLARIZING PLATE TRANSMITTANCE | FRONT |
| No. | SPEC | Ro | Rt | $[10^{-13}\,cm^2/dyn]$ | [%] | [%] | CONTRAST |
| 1 | COMPARATIVE EXAMPLE | 150 | 352 | 11 | 0.18 | 32.1 | 260 |
| 2 | PRESENT INVENTION | 122 | 311 | 13 | 0.25 | 43.5 | 2700 |
| 3 | PRESENT INVENTION | 108 | 288 | 9 | 0.21 | 44.0 | 2600 |
| 4 | PRESENT INVENTION | 77 | 253 | 14 | 0.19 | 43.9 | 2600 |
| 5 | COMPARATIVE EXAMPLE | 55 | 230 | 10 | 0.24 | 42.3 | 580 |
| 6 | COMPARATIVE EXAMPLE | 110 | 251 | 9 | 0.25 | 42.9 | 700 |
| 7 | PRESENT INVENTION | 108 | 238 | 9 | 0.19 | 43.6 | 2750 |
| 8 | PRESENT INVENTION | 89 | 220 | 8 | 0.21 | 43.1 | 2650 |
| 9 | PRESENT INVENTION | 79 | 203 | 8 | 0.25 | 31.0 | 1500 |
| 10 | PRESENT INVENTION | 92 | 219 | 10 | 0.18 | 43.7 | 2700 |
| 11 | PRESENT INVENTION | 91 | 206 | 8 | 0.21 | 43.5 | 2750 |
| 12 | PRESENT INVENTION | 88 | 208 | 9 | 0.34 | 33.4 | 2200 |
| 13 | COMPARATIVE EXAMPLE | 157 | 321 | 8 | 0.21 | 39.1 | 350 |
| 14 | PRESENT INVENTION | 76 | 211 | 15 | 0.19 | 43.6 | 2750 |
| 15 | PRESENT INVENTION | 79 | 243 | 12 | 0.23 | 44.0 | 2600 |
| 16 | COMPARATIVE EXAMPLE | 55 | 201 | 13 | 0.18 | 42.2 | 920 |
| 17 | COMPARATIVE EXAMPLE | 159 | 332 | 14 | 0.18 | 35.1 | 250 |
| 18 | PRESENT INVENTION | 78 | 207 | 11 | 0.21 | 43.1 | 2650 |
| 19 | PRESENT INVENTION | 77 | 240 | 12 | 0.21 | 43.7 | 2650 |
| 20 | COMPARATIVE EXAMPLE | 50 | 207 | 8 | 0.24 | 42.5 | 800 |
| 21 | PRESENT INVENTION | 82 | 213 | 15 | 0.18 | 44.0 | 2750 |
| 22 | PRESENT INVENTION | 77 | 223 | 9 | 0.21 | 43.8 | 2750 |
| 23 | PRESENT INVENTION | 77 | 213 | 13 | 0.22 | 39.2 | 1420 |
| 24 | PRESENT INVENTION | 71 | 201 | 13 | 0.19 | 43.8 | 2700 |
| 25 | PRESENT INVENTION | 70 | 219 | 8 | 0.23 | 43.1 | 2550 |
| 26 | PRESENT INVENTION | 69 | 209 | 14 | 0.55 | 38.4 | 2000 |
| 27 | COMPARATIVE EXAMPLE | 78 | 221 | 15 | 0.22 | 42.4 | 800 |
| 28 | PRESENT INVENTION | 77 | 201 | 9 | 0.21 | 43.2 | 2550 |
| 29 | PRESENT INVENTION | 70 | 230 | 9 | 0.25 | 43.6 | 2700 |

TABLE 4

| SAMPLE | | COMPONENT | | | | | | | |
|---|---|---|---|---|---|---|---|---|---|
| | | CELLULOSE ESTER | | VINYL-POLYMER OR OLIGOMER | | ADDITIVE 1 | | ADDITIVE 2 | |
| | | | PART BY | | PART BY | | PART BY | | PART BY |
| No. | SPEC | TYPE | MASS | TYPE | MASS | TYPE | MASS | TYPE | MASS |
| 30 | PRESENT INVENTION | A2 | 60 | B2 | 40 | — | — | — | — |
| 31 | PRESENT INVENTION | A3 | 60 | B2 | 40 | — | — | — | — |
| 32 | PRESENT INVENTION | A4 | 60 | B2 | 40 | — | — | — | — |
| 33 | PRESENT INVENTION | A7 | 60 | B2 | 40 | — | — | — | — |
| 34 | PRESENT INVENTION | A8 | 60 | B2 | 40 | — | — | — | — |
| 35 | PRESENT INVENTION | A10 | 60 | B2 | 40 | — | — | — | — |
| 36 | PRESENT INVENTION | A11 | 60 | B2 | 40 | — | — | — | — |
| 37 | PRESENT INVENTION | A14 | 60 | B2 | 40 | — | — | — | — |
| 38 | PRESENT INVENTION | A15 | 60 | B2 | 40 | — | — | — | — |
| 39 | PRESENT INVENTION | A18 | 60 | B2 | 40 | — | — | — | — |
| 40 | PRESENT INVENTION | A19 | 60 | B2 | 40 | — | — | — | — |
| 41 | PRESENT INVENTION | A21 | 60 | B2 | 40 | — | — | — | — |

TABLE 4-continued

| Sample No. | SPEC | Cellulose Ester Type | Part by Mass | Vinyl-polymer or Oligomer Type | Part by Mass | Additive 1 Type | Additive 1 Part by Mass | Additive 2 Type | Additive 2 Part by Mass |
|---|---|---|---|---|---|---|---|---|---|
| 42 | PRESENT INVENTION | A22 | 60 | B2 | 40 | — | — | — | — |
| 43 | PRESENT INVENTION | A24 | 60 | B2 | 40 | — | — | — | — |
| 44 | PRESENT INVENTION | A25 | 60 | B2 | 40 | — | — | — | — |
| 45 | PRESENT INVENTION | A28 | 60 | B2 | 40 | — | — | — | — |
| 46 | PRESENT INVENTION | A29 | 60 | B2 | 40 | — | — | — | — |
| 47 | COMPARATIVE EXAMPLE | A5 | 60 | B2 | 40 | — | — | — | — |
| 48 | COMPARATIVE EXAMPLE | A20 | 60 | B2 | 40 | — | — | — | — |
| 49 | COMPARATIVE EXAMPLE | A27 | 60 | B2 | 40 | — | — | — | — |
| 50 | PRESENT INVENTION | A18 | 70 | B1 | 30 | — | — | — | — |
| 51 | PRESENT INVENTION | A18 | 70 | B2 | 30 | — | — | — | — |
| 52 | PRESENT INVENTION | A18 | 70 | B3 | 30 | — | — | — | — |
| 53 | PRESENT INVENTION | A18 | 70 | B4 | 30 | — | — | — | — |
| 54 | PRESENT INVENTION | A18 | 70 | B5 | 30 | — | — | — | — |
| 55 | PRESENT INVENTION | A18 | 70 | B6 | 30 | — | — | — | — |
| 56 | PRESENT INVENTION | A18 | 70 | B7 | 30 | — | — | — | — |
| 57 | PRESENT INVENTION | A18 | 70 | B8 | 30 | — | — | — | — |
| 58 | PRESENT INVENTION | A18 | 70 | B9 | 30 | — | — | — | — |

| Sample No. | SPEC | Re [nm] Ro | Re [nm] Rt | Photoelastic Coefficient [$10^{-13}$ cm$^2$/dyn] | Haze [%] | Polarizing Plate Transmittance [%] | Front Contrast |
|---|---|---|---|---|---|---|---|
| 30 | PRESENT INVENTION | 52 | 135 | 3 | 0.18 | 43.1 | 2700 |
| 31 | PRESENT INVENTION | 48 | 120 | 4 | 0.19 | 43.4 | 2600 |
| 32 | PRESENT INVENTION | 38 | 110 | 6 | 0.25 | 43.3 | 2650 |
| 33 | PRESENT INVENTION | 55 | 122 | 5 | 0.19 | 43.6 | 2750 |
| 34 | PRESENT INVENTION | 40 | 102 | 7 | 0.18 | 43.1 | 2550 |
| 35 | PRESENT INVENTION | 58 | 123 | 3 | 0.18 | 43.7 | 2700 |
| 36 | PRESENT INVENTION | 55 | 120 | 5 | 0.19 | 43.7 | 2700 |
| 37 | PRESENT INVENTION | 50 | 127 | 4 | 0.21 | 44.0 | 2600 |
| 38 | PRESENT INVENTION | 41 | 108 | 7 | 0.21 | 43.7 | 2700 |
| 39 | PRESENT INVENTION | 56 | 128 | 5 | 0.21 | 43.2 | 2550 |
| 40 | PRESENT INVENTION | 38 | 108 | 7 | 0.23 | 43.9 | 2650 |
| 41 | PRESENT INVENTION | 50 | 119 | 3 | 0.22 | 43.3 | 2650 |
| 42 | PRESENT INVENTION | 49 | 120 | 5 | 0.21 | 43.6 | 2600 |
| 43 | PRESENT INVENTION | 55 | 117 | 7 | 0.22 | 43.5 | 2550 |
| 44 | PRESENT INVENTION | 46 | 132 | 3 | 0.24 | 43.1 | 2750 |
| 45 | PRESENT INVENTION | 55 | 122 | 6 | 0.18 | 43.5 | 2550 |
| 46 | PRESENT INVENTION | 50 | 121 | 5 | 0.22 | 43.5 | 2700 |
| 47 | COMPARATIVE EXAMPLE | 15 | 80 | 10 | 0.24 | 42.3 | 900 |
| 48 | COMPARATIVE EXAMPLE | 20 | 60 | 8 | 0.24 | 42.5 | 870 |
| 49 | COMPARATIVE EXAMPLE | 52 | 135 | 8 | 3.54 | 30.2 | 250 |
| 50 | PRESENT INVENTION | 81 | 146 | 6 | 0.22 | 39.2 | 1900 |
| 51 | PRESENT INVENTION | 81 | 145 | 7 | 0.18 | 43.9 | 2650 |
| 52 | PRESENT INVENTION | 71 | 153 | 7 | 0.20 | 43.4 | 2650 |
| 53 | PRESENT INVENTION | 75 | 151 | 6 | 0.22 | 44.0 | 2700 |
| 54 | PRESENT INVENTION | 73 | 151 | 4 | 0.92 | 35.6 | 1900 |
| 55 | PRESENT INVENTION | 71 | 143 | 4 | 0.23 | 44.0 | 2550 |
| 56 | PRESENT INVENTION | 74 | 153 | 4 | 0.19 | 43.7 | 2550 |
| 57 | PRESENT INVENTION | 75 | 148 | 5 | 0.22 | 44.0 | 2550 |
| 58 | PRESENT INVENTION | 78 | 144 | 3 | 0.19 | 43.3 | 2550 |

TABLE 5

| Sample No. | SPEC | Cellulose Ester Type | Part by Mass | Vinyl-polymer or Oligomer Type | Part by Mass | Additive 1 Type | Additive 1 Part by Mass | Additive 2 Type | Additive 2 Part by Mass |
|---|---|---|---|---|---|---|---|---|---|
| 59 | PRESENT INVENTION | A18 | 70 | B10 | 30 | — | — | — | — |
| 60 | PRESENT INVENTION | A18 | 70 | B11 | 30 | — | — | — | — |
| 61 | PRESENT INVENTION | A18 | 70 | B12 | 30 | — | — | — | — |
| 62 | PRESENT INVENTION | A18 | 70 | B13 | 30 | — | — | — | — |
| 63 | PRESENT INVENTION | A18 | 70 | B14 | 30 | — | — | — | — |
| 64 | PRESENT INVENTION | A18 | 70 | B15 | 30 | — | — | — | — |
| 65 | PRESENT INVENTION | A18 | 70 | B16 | 30 | — | — | — | — |
| 66 | PRESENT INVENTION | A18 | 70 | B17 | 30 | — | — | — | — |
| 67 | PRESENT INVENTION | A18 | 70 | B18 | 30 | — | — | — | — |
| 68 | PRESENT INVENTION | A18 | 70 | B19 | 30 | — | — | — | — |
| 69 | PRESENT INVENTION | A18 | 70 | B20 | 30 | — | — | — | — |

TABLE 5-continued

| No. | SPEC | | | | | | | | |
|---|---|---|---|---|---|---|---|---|---|
| 70 | PRESENT INVENTION | A18 | 70 | B21 | 30 | — | — | — | — |
| 71 | PRESENT INVENTION | A18 | 70 | B22 | 30 | — | — | — | — |
| 72 | PRESENT INVENTION | A19 | 70 | B23 | 30 | — | — | — | — |
| 73 | PRESENT INVENTION | A3 | 90 | B2 | 10 | — | — | — | — |
| 74 | PRESENT INVENTION | A7 | 80 | B2 | 20 | — | — | — | — |
| 75 | PRESENT INVENTION | A10 | 50 | B2 | 50 | — | — | — | — |
| 76 | PRESENT INVENTION | A14 | 90 | B2 | 10 | — | — | — | — |
| 77 | PRESENT INVENTION | A18 | 80 | B2 | 20 | — | — | — | — |
| 78 | PRESENT INVENTION | A21 | 50 | B2 | 50 | — | — | — | — |
| 79 | PRESENT INVENTION | A24 | 90 | B2 | 10 | — | — | — | — |
| 80 | PRESENT INVENTION | A25 | 80 | B2 | 20 | — | — | — | — |
| 81 | PRESENT INVENTION | A28 | 50 | B2 | 50 | — | — | — | — |
| 82 | PRESENT INVENTION | A3 | 40 | B2 | 60 | — | — | — | — |
| 83 | PRESENT INVENTION | A3 | 90 | B13 | 10 | — | — | — | — |
| 84 | PRESENT INVENTION | A7 | 80 | B14 | 20 | — | — | — | — |
| 85 | PRESENT INVENTION | A10 | 50 | B16 | 50 | — | — | — | — |
| 86 | PRESENT INVENTION | A14 | 90 | B17 | 10 | — | — | — | — |
| 87 | PRESENT INVENTION | A8 | 80 | B18 | 20 | — | — | — | — |

| SAMPLE | | OPTICAL CHARACTERISTICS | | | | |
|---|---|---|---|---|---|---|
| | | Re [nm] | | PHOTOELASTIC COEFFICIENT | HAZE | POLARIZING PLATE TRANSMITTANCE | FRONT |
| No. | SPEC | Ro | Rt | $[10^{-13}\,cm^2/dyn]$ | [%] | [%] | CONTRAST |
| 59 | PRESENT INVENTION | 74 | 151 | 7 | 0.18 | 43.6 | 2600 |
| 60 | PRESENT INVENTION | 73 | 153 | 3 | 0.23 | 43.6 | 2600 |
| 61 | PRESENT INVENTION | 78 | 146 | 7 | 0.22 | 44.0 | 2600 |
| 62 | PRESENT INVENTION | 74 | 148 | 7 | 0.20 | 43.4 | 2650 |
| 63 | PRESENT INVENTION | 74 | 147 | 4 | 0.21 | 43.3 | 2550 |
| 64 | PRESENT INVENTION | 77 | 148 | 5 | 0.18 | 43.3 | 2700 |
| 65 | PRESENT INVENTION | 74 | 145 | 5 | 0.19 | 43.9 | 2600 |
| 66 | PRESENT INVENTION | 81 | 151 | 4 | 0.24 | 43.7 | 2650 |
| 67 | PRESENT INVENTION | 72 | 147 | 6 | 0.18 | 44.0 | 2700 |
| 68 | PRESENT INVENTION | 75 | 151 | 6 | 0.23 | 43.4 | 2600 |
| 69 | PRESENT INVENTION | 73 | 145 | 5 | 0.23 | 43.8 | 2650 |
| 70 | PRESENT INVENTION | 77 | 148 | 5 | 0.21 | 43.8 | 2700 |
| 71 | PRESENT INVENTION | 75 | 145 | 4 | 0.25 | 43.4 | 2600 |
| 72 | PRESENT INVENTION | 53 | 126 | 6 | 0.22 | 44.0 | 2600 |
| 73 | PRESENT INVENTION | 70 | 173 | 7 | 0.22 | 43.3 | 2650 |
| 74 | PRESENT INVENTION | 88 | 184 | 7 | 0.25 | 43.2 | 2700 |
| 75 | PRESENT INVENTION | 29 | 95 | 6 | 0.20 | 43.3 | 2600 |
| 76 | PRESENT INVENTION | 70 | 173 | 6 | 0.21 | 43.6 | 2700 |
| 77 | PRESENT INVENTION | 95 | 177 | 5 | 0.22 | 43.6 | 2600 |
| 78 | PRESENT INVENTION | 35 | 103 | 4 | 0.24 | 43.3 | 2600 |
| 79 | PRESENT INVENTION | 75 | 167 | 4 | 0.23 | 43.4 | 2650 |
| 80 | PRESENT INVENTION | 92 | 179 | 4 | 0.25 | 43.4 | 2750 |
| 81 | PRESENT INVENTION | 27 | 98 | 7 | 0.20 | 43.3 | 2650 |
| 82 | PRESENT INVENTION | 20 | 90 | 3 | 0.23 | 42.8 | 2700 |
| 83 | PRESENT INVENTION | 73 | 175 | 3 | 0.25 | 43.4 | 2600 |
| 84 | PRESENT INVENTION | 91 | 179 | 4 | 0.19 | 43.2 | 2550 |
| 85 | PRESENT INVENTION | 29 | 102 | 7 | 0.19 | 43.5 | 2650 |
| 86 | PRESENT INVENTION | 70 | 173 | 7 | 0.18 | 43.3 | 2550 |
| 87 | PRESENT INVENTION | 88 | 177 | 7 | 0.22 | 43.3 | 2650 |

TABLE 6

| SAMPLE | | COMPONENT | | | | | | | |
|---|---|---|---|---|---|---|---|---|---|
| | | CELLULOSE ESTER | | VINYL-POLYMER OR OLIGOMER | | ADDITIVE 1 | | ADDITIVE 2 | |
| No. | SPEC | TYPE | PART BY MASS | TYPE | PART BY MASS | TYPE | PART BY MASS | TYPE | PART BY MASS |
| 88 | PRESENT INVENTION | A21 | 50 | B19 | 50 | — | — | — | — |
| 89 | PRESENT INVENTION | A24 | 90 | B20 | 10 | — | — | — | — |
| 90 | PRESENT INVENTION | A25 | 80 | B21 | 20 | — | — | — | — |
| 91 | PRESENT INVENTION | A28 | 50 | B22 | 50 | — | — | — | — |
| 92 | PRESENT INVENTION | A28 | 50 | B23 | 50 | — | — | — | — |
| 93 | PRESENT INVENTION | A3 | 99.9 | — | — | C1 | 0.1 | — | — |
| 94 | PRESENT INVENTION | A14 | 95 | — | — | C2 | 5.0 | — | — |
| 95 | PRESENT INVENTION | A18 | 99 | — | — | C1 | 1.0 | — | — |
| 96 | PRESENT INVENTION | A24 | 98 | — | — | C2 | 2.0 | — | — |
| 97 | PRESENT INVENTION | A3 | 84.9 | — | — | C1 | 0.1 | C3 | 15 |

TABLE 6-continued

| | | | | | | | | | |
|---|---|---|---|---|---|---|---|---|---|
| 98 | PRESENT INVENTION | A14 | 85 | — | — | C2 | 5.0 | C4 | 10 |
| 99 | PRESENT INVENTION | A18 | 85 | — | — | C1 | 1.0 | C3 | 14 |
| 100 | PRESENT INVENTION | A24 | 85 | — | — | C2 | 2.0 | C4 | 13 |
| 101 | PRESENT INVENTION | A3 | 69.9 | — | — | C1 | 0.1 | C5 | 30 |
| 102 | PRESENT INVENTION | A14 | 70 | — | — | C2 | 5.0 | C6 | 25 |
| 103 | PRESENT INVENTION | A18 | 70 | — | — | C1 | 1.0 | C7 | 29 |
| 104 | PRESENT INVENTION | A24 | 70 | — | — | C2 | 2.0 | C8 | 28 |
| 105 | PRESENT INVENTION | A14 | 70 | B2 | 25 | C3 | 5 | — | — |
| 106 | PRESENT INVENTION | A14 | 60 | B3 | 30 | C4 | 10 | — | — |
| 107 | PRESENT INVENTION | A14 | 50 | B4 | 35 | C3 | 15 | — | — |
| 108 | PRESENT INVENTION | A14 | 70 | B5 | 10 | C4 | 20 | — | — |
| 109 | PRESENT INVENTION | A14 | 70 | B6 | 10 | C4 | 30 | — | — |
| 110 | PRESENT INVENTION | A3 | 60 | B4 | 15 | C5 | 15 | C3 | 10 |
| 111 | PRESENT INVENTION | A14 | 60 | B5 | 15 | C6 | 15 | C4 | 10 |
| 112 | PRESENT INVENTION | A18 | 60 | B6 | 20 | C7 | 20 | — | — |
| 113 | PRESENT INVENTION | A24 | 60 | — | — | C8 | 40 | — | — |
| 114 | PRESENT INVENTION | A3 | 60 | — | — | C9 | 40 | — | — |
| 115 | PRESENT INVENTION | A14 | 60 | — | — | C10 | 40 | — | — |
| 116 | COMPARATIVE EXAMPLE | | | | JP2010-529216A, EXAMPLE 34 | | | | |

| | | SAMPLE | Re [nm] | | PHOTOELASTIC COEFFICIENT | HAZE | POLARIZING PLATE TRANSMITTANCE | FRONT |
|---|---|---|---|---|---|---|---|---|
| No. | SPEC | | Ro | Rt | [$10^{-13}$ cm$^2$/dyn] | [%] | [%] | CONTRAST |
| 88 | PRESENT INVENTION | | 26 | 102 | 4 | 0.20 | 44.0 | 2700 |
| 89 | PRESENT INVENTION | | 74 | 173 | 5 | 0.19 | 44.0 | 2650 |
| 90 | PRESENT INVENTION | | 92 | 183 | 7 | 0.22 | 43.1 | 2700 |
| 91 | PRESENT INVENTION | | 27 | 100 | 3 | 0.18 | 43.5 | 2650 |
| 92 | PRESENT INVENTION | | 33 | 95 | 7 | 0.23 | 43.4 | 2700 |
| 93 | PRESENT INVENTION | | 110 | 293 | 9 | 0.19 | 44.0 | 2650 |
| 94 | PRESENT INVENTION | | 98 | 275 | 8 | 0.24 | 43.1 | 2750 |
| 95 | PRESENT INVENTION | | 107 | 288 | 11 | 0.23 | 43.8 | 2700 |
| 96 | PRESENT INVENTION | | 102 | 283 | 8 | 0.21 | 43.2 | 2600 |
| 97 | PRESENT INVENTION | | 97 | 240 | 15 | 0.25 | 43.5 | 2700 |
| 98 | PRESENT INVENTION | | 93 | 246 | 14 | 0.23 | 43.3 | 2700 |
| 99 | PRESENT INVENTION | | 91 | 246 | 12 | 0.24 | 43.3 | 2650 |
| 100 | PRESENT INVENTION | | 94 | 242 | 13 | 0.19 | 43.9 | 2750 |
| 101 | PRESENT INVENTION | | 74 | 204 | 10 | 0.18 | 43.5 | 2650 |
| 102 | PRESENT INVENTION | | 76 | 200 | 11 | 0.25 | 43.3 | 2550 |
| 103 | PRESENT INVENTION | | 79 | 204 | 9 | 0.25 | 43.6 | 2550 |
| 104 | PRESENT INVENTION | | 76 | 203 | 13 | 0.22 | 43.8 | 2700 |
| 105 | PRESENT INVENTION | | 71 | 199 | 3 | 0.24 | 43.2 | 2650 |
| 106 | PRESENT INVENTION | | 63 | 168 | 5 | 0.18 | 43.2 | 2750 |
| 107 | PRESENT INVENTION | | 52 | 144 | 3 | 0.20 | 43.8 | 2750 |
| 108 | PRESENT INVENTION | | 81 | 202 | 3 | 0.18 | 43.5 | 2600 |
| 109 | PRESENT INVENTION | | 76 | 202 | 7 | 0.24 | 43.1 | 2700 |
| 110 | PRESENT INVENTION | | 61 | 175 | 4 | 0.24 | 43.8 | 2750 |
| 111 | PRESENT INVENTION | | 61 | 168 | 6 | 0.22 | 43.1 | 2550 |
| 112 | PRESENT INVENTION | | 62 | 171 | 5 | 0.20 | 43.5 | 2750 |
| 113 | PRESENT INVENTION | | 68 | 173 | 8 | 0.20 | 43.2 | 2750 |
| 114 | PRESENT INVENTION | | 61 | 175 | 13 | 0.24 | 43.4 | 2650 |
| 115 | PRESENT INVENTION | | 63 | 177 | 9 | 0.20 | 43.2 | 2550 |
| 116 | COMPARATIVE EXAMPLE | | 3 | 304 | 18 | 0.16 | 42.0 | 800 |

In Table 6, the symbols C1 to C10 in the columns of "additive 1" and "additive 2" indicate saccharide-carboxylic acid ester compounds and compounds expressed by the formula (B) described in the description, and specifically indicate the following compounds.

C1: Elecut S-412-2, C2: Neopelex G-65, C3: A-6, C4: A-5, C5: B-1, C6: B-2, C7: B-3, C8: B-4, C9: B-5 and C10: B-6.

Tables 3 to 6 show the results of the phase difference film of the present invention and the polarizing plate and the liquid crystal display device using the phase difference film. As can be seen from the Tables, the cellulose ester itself of the present invention show improved transparency and compatibility with other kinds of resins or additives compared with comparative examples, and a large phase difference (retardation) characteristics can be obtained despite its small thickness. When the film is applied (fabricated) to the polarizing plate and evaluated as the liquid crystal display device, high contrast property can be obtained.

INDUSTRIAL APPLICABILITY

The phase difference film of the invention can exhibits high phase difference property despite its thin film thickness and can preferably be applied to a polarizing plate and a liquid crystal display device to obtain a high contrast and a high optical transmittance.

The invention claimed is:

1. A phase difference film having a layer comprising a cellulose ester which is obtained by substituting an acyl group having at least two carbon atoms for a hydroxy group in a glucose unit of a cellulose,
    wherein the film satisfies the following expressions (1) and (2):

$$1.0 \leq DS_2 + DS_3 + DS_6 \leq 2.0 \quad (1) \text{ and}$$

$$0.6 \leq DS_6 \quad (2),$$

wherein $DS_2$, $DS_3$ and $DS_6$ are degrees of substitution of the acyl groups for the hydroxy groups at a second (2C), third (3C) and sixth (6C) position, respectively, of the glucose unit, and the layer further comprising at least one compound in an amount of 1.0 to 50% b mass with respect to the total mass of the phase difference film, the at least one compound being selected from the group consisting of a vinyl-based polymer, a vinyl-based oligomer, a saccharide-carboxylic acid ester compound and a compound expressed by the following formula (B): B-(G-A)$_n$-G-B, wherein A represents C4-12 alkylene dicarboxylic acid residue or a C6-12 aryl dicarboxylic acid residue, B represents a hydroxyl group or a carboxylic acid residue, G represents a C2-12 alkylene glycol residue, a C6-12 glycol residue or a C4-12 oxyalkylene glycol residue, and n represents an integer which is one or greater.

2. The phase difference film of claim 1 which has a haze value is 0.01 to 0.80%.

3. A method for producing the phase difference film of claim 2, wherein a degree of acyl group substitution for the hydroxy group at the 6C position of the glucose unit is adjusted based on an acylation reaction rate,
the method comprising a step of preparing a dope by dissolving the cellulose ester and the at least one compound selected from the group consisting of a vinyl-based polymer, a vinyl-based oligomer, a saccharide-carboxylic acid ester compound and a compound expressed by the formula (B) in a solvent.

4. A polarizing plate provided with the phase difference film of claim 2.

5. A liquid crystal display device provided with the phase difference film of claim 3.

6. A method for producing the phase difference film of claim 1, wherein a degree of acyl group substitution for the hydroxy group at the 6C position of the glucose unit is adjusted based on an acylation reaction rate,
the method comprising a step of preparing a dope by dissolving the cellulose ester and the at least one compound selected from the group consisting of a vinyl-based polymer, a vinyl-based oligomer, a saccharide-carboxylic acid ester compound and a compound expressed by the formula (B), in a solvent.

7. A polarizing plate provided with the phase difference film of claim 1.

8. A liquid crystal display device provided with the phase difference film of claim 1.

9. The phase difference film of claim 1, wherein the at least one compound is a vinyl-based polymer substituted by a substituent or a vinyl-based oligomer substituted by a substituent, said substituent being selected from the group consisting of a carboxy group, an alkoxycarbonyl group, a hydroxy group, an amino group, an amido group and a sulfone group.

10. The phase difference film of claim 1, wherein the at least one compound is a vinyl-based polymer or a vinyl-based oligomer, which is made from a monomer selected from the group consisting of an acrylic ester and a methacrylic ester.

* * * * *